United States Patent
Hosseini et al.

(10) Patent No.: US 12,295,005 B2
(45) Date of Patent: May 6, 2025

(54) ASSIGNMENT FOR CHANNEL STATE INFORMATION REPORTING ON PHYSICAL UPLINK CONTROL CHANNEL

(71) Applicant: QUALCOMM INCORPORATED, San Diego, CA (US)

(72) Inventors: Seyedkianoush Hosseini, San Diego, CA (US); Yi Huang, San Diego, CA (US); Wei Yang, San Diego, CA (US); Yu Zhang, San Diego, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/758,849

(22) PCT Filed: Feb. 6, 2020

(86) PCT No.: PCT/CN2020/074413
§ 371 (c)(1),
(2) Date: Jul. 14, 2022

(87) PCT Pub. No.: WO2021/155528
PCT Pub. Date: Aug. 12, 2021

(65) Prior Publication Data
US 2023/0038113 A1    Feb. 9, 2023

(51) Int. Cl.
*H04W 72/23* (2023.01)
*H04W 24/10* (2009.01)
(Continued)

(52) U.S. Cl.
CPC ........... *H04W 72/23* (2023.01); *H04W 24/10* (2013.01); *H04W 72/1263* (2013.01); *H04W 72/569* (2023.01)

(58) Field of Classification Search
CPC ... H04W 72/23; H04W 74/10; H04W 72/569; H04W 72/1263
See application file for complete search history.

(56) References Cited

U.S. PATENT DOCUMENTS

| 12,035,353 B2 * | 7/2024 | Hosseini | H04B 7/063 |
| 2021/0320700 A1 * | 10/2021 | Nam | H04W 76/28 |

FOREIGN PATENT DOCUMENTS

| CN | 105765886 A | 7/2016 |
| CN | 107733499 A | 2/2018 |

(Continued)

OTHER PUBLICATIONS

3GPP: "3rd Generation Partnership Project, Technical Specification Group Radio Access Network, NR, Physical Layer Procedures for Data (Release 16)", 3GPP Standard, Technical Specification, 3GPP TS 38.214, 3rd Generation Partnership Project, Mobile Competence Centre, 650, Route Des Lucioles, F-06921, Sophia-Antipolis Cedex, France, vol. RAN WG1, No. V16.0.0, Dec. 2019, Jan. 14, 2020, XP051860777, pp. 1-147, Section 5.2.

(Continued)

*Primary Examiner* — Sulaiman Nooristany
(74) *Attorney, Agent, or Firm* — Holland & Hart LLP

(57) ABSTRACT

Methods, systems, and devices for wireless communications are described. A receiving device (such as user equipment (UE)) may receive a downlink grant including an indication to report channel state information. The receiving device may identify, based on the downlink grant, a number of channel state information processing units associated with reporting the channel state information, and may determine that an available number of channel state information processing units is less than the number of channel state information processing units. In some cases, the receiving device may allocate, based on the determining, a set of channel state information processing units including the (Continued)

available number of channel state information processing units and one or more additional channel state information processing units. The receiving device may then transmit the channel state information report based on the set of channel state information processing units.

35 Claims, 16 Drawing Sheets

(51) Int. Cl.
*H04W 72/1263* (2023.01)
*H04W 72/566* (2023.01)

(56) References Cited

FOREIGN PATENT DOCUMENTS

| | | | |
|---|---|---|---|
| CN | 110475283 | A | 11/2019 |
| CN | 110661560 | A | 1/2020 |
| WO | WO-2014067139 | A1 | 5/2014 |
| WO | WO-2019216642 | A1 | 11/2019 |

OTHER PUBLICATIONS

SAMSUNG: "On CSI Processing and Reporting Latency", 3GPP TSG RAN WG1 Meeting #93, R1-1806713, 3GPP, Mobile Competence Centre, 650, Route Des Lucioles, F-06921 Sophia-Antipolis Cedex, France, vol. RAN WG1, No. Busan, Korea, May 21, 2018-May 25, 2018, May 20, 2018, XP051441915, 4 Pages.
Spreadtrum Communications: "Remaining issues on CSI acquisition", 3GPP TSG RAN WG1 Meeting #94bis, R1-1811011 Remaining Issues on CSI Acquisition, 3GPP, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, XP051518415, 7 Pages.
Supplementary European Search Report—EP20917530—Search Authority—Munich—Sep. 28, 2023.
International Search Report and Written Opinion—PCT/CN2020/074413—ISA/EPO—Nov. 10, 2020.
Lenovo et al., "Remaining Issues on CSI Reporting", 3GPP TSG RAN WG1 Meeting #93, R1-1806340, Busan, South Korea, May 21-25, 2018, 3 Pages.

* cited by examiner

Downlink Grant 210

Channel State Information Report 215

ASSIGNMENT FOR CHANNEL STATE INFORMATION REPORTING ON PHYSICAL UPLINK CONTROL CHANNEL

CROSS REFERENCE

The present Application is a 371 national stage filing of International PCT Application No. PCT/CN2020/074413 by HOSSEINI et al. entitled "ASSIGNMENT FOR CHANNEL STATE INFORMATION REPORTING ON PHYSICAL UPLINK CONTROL CHANNEL," filed Feb. 6, 2020, which is assigned to the assignee hereof, and which is expressly incorporated by reference in its entirety herein.

BACKGROUND

The following relates generally to wireless communications, and more specifically to channel state information processing unit assignment for channel state information reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support channel state information processing unit assignment for channel state information reporting. Generally, the described techniques provide for updating channel state information reporting when a number of available channel state information processing units (e.g., one or more) is insufficient for computing the channel state information. In some scenarios, a receiving device (such as a user equipment (UE)) may be capable of concurrently or simultaneously performing a defined number of channel state information operations. The UE may be configured with one or more rules to efficiently allocate a number of channel state information processing units to compute channel state information reports. In some examples, the channel state information reports may be associated with a low latency communication. In some examples, the channel state information reports may be associated with a higher priority communication compared to a second communication (e.g., a lower priority communication). In some examples, a UE may receive a downlink grant triggering a channel state information report, and the UE may calculate a number of channel state information processing units associated with transmitting the channel state information report. In some cases, the UE may determine that an available number of channel state information processing units of the UE is less than the number of channel state information processing units associated with transmitting the channel state information report. In some examples, the UE may release (e.g., allocate) at least one additional channel state information processing unit to a set of channel state information processing units associated with transmitting the channel state information report so that the UE will enough available number of channel state information processing units for transmitting the channel state information report. The UE may then transmit the channel state information report using the allocated set of channel state information processing units.

A method of wireless communication at a UE is described. The method may include receiving a downlink grant including an indication to report channel state information, identifying, based on the downlink grant, a number of channel state information processing units associated with reporting the channel state information, determining that an available number of channel state information processing units is less than the number of channel state information processing units, allocating, based on the determining, a set of channel state information processing units for transmitting a channel state information report, the set of channel state information processing units including the available number of channel state information processing units and one or more additional channel state information processing units, and transmitting the channel state information report based on the set of channel state information processing units.

An apparatus for wireless communication at a UE is described. The apparatus may include a processor, memory coupled with the processor, and instructions stored in the memory. The instructions may be executable by the processor to cause the apparatus to receive a downlink grant including an indication to report channel state information, identify, based on the downlink grant, a number of channel state information processing units associated with reporting the channel state information, determine that an available number of channel state information processing units is less than the number of channel state information processing units, allocate, based on the determining, a set of channel state information processing units for transmitting a channel state information report, the set of channel state information processing units including the available number of channel state information processing units and one or more additional channel state information processing units, and transmit the channel state information report based on the set of channel state information processing units.

Another apparatus for wireless communication at a UE is described. The apparatus may include means for receiving a downlink grant including an indication to report channel state information, identifying, based on the downlink grant, a number of channel state information processing units associated with reporting the channel state information, determining that an available number of channel state information processing units is less than the number of channel state information processing units, allocating, based on the determining, a set of channel state information processing units for transmitting a channel state information report, the set of channel state information processing units including the available number of channel state information processing units and one or more additional channel state information processing units, and transmitting the channel state information report based on the set of channel state information processing units.

A non-transitory computer-readable medium storing code for wireless communication at a UE is described. The code may include instructions executable by a processor to receive a downlink grant including an indication to report channel state information, identify, based on the downlink grant, a number of channel state information processing units associated with reporting the channel state information, determine that an available number of channel state information processing units is less than the number of channel state information processing units, allocate, based on the determining, a set of channel state information processing units for transmitting a channel state information report, the set of channel state information processing units including the available number of channel state information processing units and one or more additional channel state information processing units, and transmit the channel state information report based on the set of channel state information processing units.

Some examples of the method, apparatuses, and non-transitory computer-readable medium described herein may further include operations, features, means, or instructions for receiving an uplink grant including a second indication to report second channel state information, and determining, based on the uplink grant, a number of channel state information processing units associated with reporting the second channel state information, where the available number of channel state information processing units may be identified before allocating the number of channel state information processing units for reporting the second channel state information.

Some examples of the method, apparatuses, and non-transitory computer-readable medium described herein may further include operations, features, means, or instructions for receiving an uplink grant including a second indication to report second channel state information, and determining, based on the uplink grant, a number of channel state information processing units associated with reporting the second channel state information, where the available number of channel state information processing units may be identified after allocating the number of channel state information processing units for reporting the second channel state information.

Some examples of the method, apparatuses, and non-transitory computer-readable medium described herein may further include operations, features, means, or instructions for receiving an uplink grant including a second indication to report second channel state information, determining, based on the uplink grant, a number of channel state information processing units associated with reporting the second channel state information, and determining that the downlink grant may be associated with a higher priority than the uplink grant, where the available number of channel state information processing units may be identified, based on determining that the downlink grant may be associated with the higher priority than the uplink grant, before allocating the number of channel state information processing units for reporting the second channel state information.

Some examples of the method, apparatuses, and non-transitory computer-readable medium described herein may further include operations, features, means, or instructions for receiving an uplink grant including a second indication to report second channel state information, determining, based on the uplink grant, a number of channel state information processing units associated with reporting the second channel state information, and determining that the uplink grant may be associated with a higher priority than the downlink grant, where the available number of channel state information processing units may be identified, based on determining that the uplink grant may be associated with the higher priority than the downlink grant, after allocating the number of channel state information processing units for reporting the second channel state information.

Some examples of the method, apparatuses, and non-transitory computer-readable medium described herein may further include operations, features, means, or instructions for releasing a previously allocated channel state information processing unit based on determining that the uplink grant is associated with the higher priority than the downlink grant, where allocating the set of channel state information processing units is based on releasing the previously allocated channel state information processing unit.

Some examples of the method, apparatuses, and non-transitory computer-readable medium described herein may further include operations, features, means, or instructions for receiving an uplink grant including a second indication to report second channel state information, determining, based on the uplink grant, a number of channel state information processing units associated with reporting the second channel state information, and determining that the uplink grant may be associated with the same priority as the downlink grant, where the available number of channel state information processing units may be identified, based on determining that the uplink grant may be associated with the same priority as the downlink grant, before allocating the number of channel state information processing units for reporting the second channel state information.

Some examples of the method, apparatuses, and non-transitory computer-readable medium described herein may further include operations, features, means, or instructions for receiving an uplink grant including a second indication to report second channel state information, determining, based on the uplink grant, a number of channel state information processing units associated with reporting the second channel state information, and determining that the uplink grant may be associated with the same priority as the downlink grant, where the available number of channel state information processing units may be identified, based on determining that the uplink grant may be associated with the same priority as the downlink grant, after allocating the number of channel state information processing units for reporting the second channel state information.

Some examples of the method, apparatuses, and non-transitory computer-readable medium described herein may further include operations, features, means, or instructions for receiving an uplink grant including a second indication to report second channel state information, and determining that the uplink grant may be received concurrently with the downlink grant, where identifying the available number of channel state information processing units may be based on determining that the uplink grant may be received concurrently with the downlink grant.

In some examples of the method, apparatuses, and non-transitory computer-readable medium described herein, the determining further may include operations, features, means, or instructions for determining that the uplink grant may be received concurrently with the downlink grant based on a last symbol of a physical downlink control channel associated with the downlink grant being the same as a last symbol of a physical downlink control channel associated with the uplink grant.

Some examples of the method, apparatuses, and non-transitory computer-readable medium described herein may further include operations, features, means, or instructions for determining whether the additional channel state information processing unit may be associated with a prior downlink grant, where allocating the set of channel state information processing units may be based on determining that the additional channel state information processing unit may be associated with the prior downlink grant.

In some examples of the method, apparatuses, and non-transitory computer-readable medium described herein, allocating the set of channel state information processing units further may include operations, features, means, or instructions for determining a priority associated with a previously allocated channel state information processing unit, and releasing the previously allocated channel state information processing unit based on the determined priority, where the additional channel state information processing unit includes the released channel state information processing unit.

In some examples of the method, apparatuses, and non-transitory computer-readable medium described herein, the additional channel state information processing unit may be associated with a prior downlink grant. In some examples of the method, apparatuses, and non-transitory computer-readable medium described herein, the prior downlink grant may have a lower priority than the downlink grant.

In some examples of the method, apparatuses, and non-transitory computer-readable medium described herein, allocating the set of channel state information processing units further may include operations, features, means, or instructions for identifying a first previously allocated channel state information processing unit associated with a first uplink grant and a second previously allocated channel state information processing unit associated with a second uplink grant, determining that the first uplink grant may be received before the second uplink grant, and releasing the first previously allocated channel state information processing unit based on determining that the first uplink grant may be received before the second uplink grant, where the additional channel state information processing unit includes the released channel state information processing unit.

In some examples of the method, apparatuses, and non-transitory computer-readable medium described herein, allocating the set of channel state information processing units further may include operations, features, means, or instructions for identifying a previously allocated channel state information processing unit associated with an uplink grant, determining a type of reporting associated with the previously allocated channel state information processing unit, and releasing the previously allocated channel state information processing unit based on the type of reporting, where the additional channel state information processing unit includes the released channel state information processing unit. In some examples of the method, apparatuses, and non-transitory computer-readable medium described herein, the type of reporting includes periodic channel state information reporting, semi-persistent channel state information reporting, aperiodic channel state information reporting, or any combination thereof.

In some examples of the method, apparatuses, and non-transitory computer-readable medium described herein, allocating the set of channel state information processing units further may include operations, features, means, or instructions for identifying a previously allocated channel state information processing unit associated with an uplink grant, determining one or more reporting parameters associated with the previously allocated channel state information processing unit, and releasing the previously allocated channel state information processing unit based on the one or more reporting parameters, where the additional channel state information processing unit includes the released channel state information processing unit.

In some examples of the method, apparatuses, and non-transitory computer-readable medium described herein, the one or more reporting parameters include a channel quality indicator, a pre-coding matrix indicator, a rank indicator, or any combination thereof. In some examples of the method, apparatuses, and non-transitory computer-readable medium described herein, allocating the set of channel state information processing units further may include operations, features, means, or instructions for determining that a previously allocated channel state information processing unit may be associated with an uplink grant, and releasing the previously allocated channel state information processing unit based on determining that the previously allocated channel state information processing unit may be associated with the uplink grant, where the additional channel state information processing unit includes the released channel state information processing unit.

In some examples of the method, apparatuses, and non-transitory computer-readable medium described herein, allocating the set of channel state information processing units further may include operations, features, means, or instructions for identifying a previously allocated channel state information processing unit associated with an uplink grant, determining a priority associated with the uplink grant, and releasing the previously allocated channel state information processing unit based on the determined priority, where the additional channel state information processing unit includes the released channel state information processing unit.

In some examples of the method, apparatuses, and non-transitory computer-readable medium described herein, allocating the set of channel state information processing units further may include operations, features, means, or instructions for identifying a first previously allocated channel state information processing unit associated with an uplink grant and a second previously allocated channel state information processing unit associated with a prior downlink grant, determining that the prior downlink grant may have a lower priority than the uplink grant, and releasing the second previously allocated channel state information processing unit based on the determined priority, where the additional channel state information processing unit includes the released channel state information processing unit.

In some examples of the method, apparatuses, and non-transitory computer-readable medium described herein, allocating the set of channel state information processing units further may include operations, features, means, or instructions for determining that a set of previously allocated channel state information processing units may be associated with a second downlink grant, and releasing all the set of previously allocated channel state information processing units based on determining that the set of previously allocated channel state information processing units may be associated with the second downlink grant, where the additional channel state information processing unit includes the released set of channel state information processing units.

Some examples of the method, apparatuses, and non-transitory computer-readable medium described herein may further include operations, features, means, or instructions for determining that a set of previously allocated channel state information processing units may be associated with a second downlink grant, and refraining from releasing the set of previously allocated channel state information processing units based on determining that the set of previously allocated channel state information processing units may be associated with the second downlink grant, where allocating the set of channel state information processing units may be based on refraining from releasing the set of previously allocated channel state information processing units.

In some examples of the method, apparatuses, and non-transitory computer-readable medium described herein, allocating the set of channel state information processing units further may include operations, features, means, or instructions for identifying a first set of previously allocated channel state information processing units associated with a second downlink grant and a second set of previously allocated channel state information processing units associated with a third downlink grant, determining that the second downlink grant may have a higher priority than the third downlink grant, and releasing the first set of previously allocated channel state information processing units based on determining that the second downlink grant may have the higher priority than the third downlink grant, where the additional channel state information processing unit includes the released set of channel state information processing units.

In some examples of the method, apparatuses, and non-transitory computer-readable medium described herein, a priority associated with the second downlink grant may be based on a type of indication associated with the second downlink grant and a priority associated with the third downlink grant may be based on the type of indication associated with the third downlink grant, and where allocating the set of channel state information processing units for transmitting the channel state information report may be based on the priority associated with the second downlink grant and the priority associated with the third downlink grant.

In some examples of the method, apparatuses, and non-transitory computer-readable medium described herein, the type of indication includes a type 1 indication or a type 2 indication. In some examples of the method, apparatuses, and non-transitory computer-readable medium described herein, the type 2 indication may have a higher priority than the type 1 indication.

In some examples of the method, apparatuses, and non-transitory computer-readable medium described herein, transmitting the channel state information report further may include operations, features, means, or instructions for transmitting the channel state information report via a physical uplink shared channel or a physical uplink control channel. In some examples of the method, apparatuses, and non-transitory computer-readable medium described herein, receiving the downlink grant further may include operations, features, means, or instructions for receiving the downlink grant via a physical downlink control channel.

In some examples of the method, apparatuses, and non-transitory computer-readable medium described herein, receiving the downlink grant further may include operations, features, means, or instructions for receiving the downlink grant via downlink control information. In some examples of the method, apparatuses, and non-transitory computer-readable medium described herein, the downlink grant may be associated with an ultra reliable low latency communication.

Some examples of the method, apparatuses, and non-transitory computer-readable medium described herein may further include operations, features, means, or instructions for decoding a physical downlink shared channel associated with the downlink grant, where transmitting the channel state information report is based on decoding the physical downlink shared channel.

In some examples of the method, apparatuses, and non-transitory computer-readable medium described herein, the number of channel state information processing units may be identified based on a capability associated with the UE. In some examples of the method, apparatuses, and non-transitory computer-readable medium described herein, the number of channel state information processing units may be predefined for the UE.

A method of wireless communication at a base station is described. The method may include determining a configuration for a UE to allocate a set of channel state information processing units based on an available number of channel state information processing units and a number of channel state information processing units associated with reporting channel state information, transmitting the configuration for the UE to allocate the set of channel state information processing units, transmitting a downlink grant including an indication for the UE to report the channel state information based on the configuration, and receiving, in response to the downlink grant, a channel state information report based on the set of channel state information processing units.

An apparatus for wireless communication at a base station is described. The apparatus may include a processor, memory coupled with the processor, and instructions stored in the memory. The instructions may be executable by the processor to cause the apparatus to determine a configuration for a UE to allocate a set of channel state information processing units based on an available number of channel state information processing units and a number of channel state information processing units associated with reporting channel state information, transmit the configuration for the UE to allocate the set of channel state information processing units, transmit a downlink grant including an indication for the UE to report the channel state information based on the configuration, and receive, in response to the downlink grant, a channel state information report based on the set of channel state information processing units.

Another apparatus for wireless communication at a base station is described. The apparatus may include means for determining a configuration for a UE to allocate a set of channel state information processing units based on an available number of channel state information processing units and a number of channel state information processing units associated with reporting channel state information, transmitting the configuration for the UE to allocate the set of channel state information processing units, transmitting a downlink grant including an indication for the UE to report the channel state information based on the configuration, and receiving, in response to the downlink grant, a channel state information report based on the set of channel state information processing units.

A non-transitory computer-readable medium storing code for wireless communication at a base station is described. The code may include instructions executable by a processor to determine a configuration for a UE to allocate a set of channel state information processing units based on an available number of channel state information processing units and a number of channel state information processing units associated with reporting channel state information, transmit the configuration for the UE to allocate the set of channel state information processing units, transmit a downlink grant including an indication for the UE to report the channel state information based on the configuration, and receive, in response to the downlink grant, a channel state information report based on the set of channel state information processing units.

Some examples of the method, apparatuses, and non-transitory computer-readable medium described herein may further include operations, features, means, or instructions for transmitting an uplink grant including a second indication for the UE to report second channel state information, where the configuration includes a second configuration for the UE to identify the available number of channel state information processing units before allocating a number of channel state information processing units for reporting the second channel state information.

Some examples of the method, apparatuses, and non-transitory computer-readable medium described herein may further include operations, features, means, or instructions for transmitting an uplink grant including a second indication to report second channel state information, where the configuration includes a second configuration for the UE to identify the available number of channel state information processing units after allocating a number of channel state information processing units for reporting the second channel state information.

Some examples of the method, apparatuses, and non-transitory computer-readable medium described herein may further include operations, features, means, or instructions for transmitting an uplink grant including a second indication to report second channel state information, where the configuration includes a second configuration for the UE to identify the available number of channel state information processing units, based on determining that the downlink grant may be associated with a higher priority than the uplink grant, before allocating a number of channel state information processing units for reporting the second channel state information.

Some examples of the method, apparatuses, and non-transitory computer-readable medium described herein may further include operations, features, means, or instructions for transmitting an uplink grant including a second indication to report second channel state information, where the configuration includes a second configuration for the UE to identify the available number of channel state information processing units, based on determining that the uplink grant may be associated with a higher priority than the downlink grant, after allocating a number of channel state information processing units for reporting the second channel state information.

In some examples of the method, apparatuses, and non-transitory computer-readable medium described herein, the configuration includes a third configuration for the UE to release a previously allocated channel state information processing unit based on determining that the uplink grant is associated with the higher priority than the downlink grant.

Some examples of the method, apparatuses, and non-transitory computer-readable medium described herein may further include operations, features, means, or instructions for transmitting an uplink grant including a second indication to report second channel state information, where the configuration includes a second configuration for the UE to identify the available number of channel state information processing units, based on determining that the uplink grant may be associated with the same priority as the downlink grant, before allocating a number of channel state information processing units for reporting the second channel state information.

Some examples of the method, apparatuses, and non-transitory computer-readable medium described herein may further include operations, features, means, or instructions for transmitting an uplink grant including a second indication to report second channel state information, where the configuration includes a second configuration for the UE to identify the available number of channel state information processing units, based on determining that the uplink grant may be associated with the same priority as the downlink grant, after allocating a number of channel state information processing units for reporting the second channel state information.

Some examples of the method, apparatuses, and non-transitory computer-readable medium described herein may further include operations, features, means, or instructions for transmitting an uplink grant concurrently with the downlink grant, the uplink grant including a second indication to report second channel state information, where the configuration includes a second configuration for the UE to identify the available number of channel state information processing units based on that the uplink grant being transmitted concurrently with the downlink grant.

In some examples of the method, apparatuses, and non-transitory computer-readable medium described herein, the configuration includes a second configuration for the UE to allocate the set of channel state information processing units based on determining that the additional channel state information processing unit may be associated with a prior downlink grant.

In some examples of the method, apparatuses, and non-transitory computer-readable medium described herein, the configuration includes a second configuration for the UE to release the previously allocated channel state information processing unit based on a priority associated with a previously allocated channel state information processing unit, and where the additional channel state information processing unit includes the released channel state information processing unit.

In some examples of the method, apparatuses, and non-transitory computer-readable medium described herein, the additional channel state information processing unit may be associated with a prior downlink grant. In some examples of the method, apparatuses, and non-transitory computer-readable medium described herein, the prior downlink grant may have a lower priority than the downlink grant.

In some examples of the method, apparatuses, and non-transitory computer-readable medium described herein, the configuration includes a second configuration for the UE to release a previously allocated channel state information processing unit associated with a first uplink grant based on determining that the first uplink grant may be received at the UE before a second uplink grant, and where the additional channel state information processing unit includes the released channel state information processing unit.

In some examples of the method, apparatuses, and non-transitory computer-readable medium described herein, the configuration includes a second configuration for the UE to release a previously allocated channel state information processing unit associated with an uplink grant based on a type of reporting associated with the previously allocated channel state information processing unit, and where the additional channel state information processing unit includes the released channel state information processing unit.

In some examples of the method, apparatuses, and non-transitory computer-readable medium described herein, the type of reporting includes periodic channel state information reporting, semi-persistent channel state information reporting, aperiodic channel state information reporting, or any combination thereof.

In some examples of the method, apparatuses, and non-transitory computer-readable medium described herein, the configuration includes a second configuration for the UE to release a previously allocated channel state information processing unit associated with an uplink grant based on one or more reporting parameters associated with the previously allocated channel state information processing unit, and where the additional channel state information processing unit includes the released channel state information processing unit.

In some examples of the method, apparatuses, and non-transitory computer-readable medium described herein, the one or more reporting parameters include a channel quality indicator, a pre-coding matrix indicator, a rank indicator, or any combination thereof. In some examples of the method, apparatuses, and non-transitory computer-readable medium described herein, the configuration includes a second configuration for the UE to release a previously allocated channel state information processing unit based on determining that the previously allocated channel state information processing unit may be associated with an uplink grant, and where the additional channel state information processing unit includes the released channel state information processing unit.

In some examples of the method, apparatuses, and non-transitory computer-readable medium described herein, the configuration includes a second configuration for the UE to release a previously allocated channel state information processing unit associated with an uplink grant based on a priority associated with the uplink grant, and where the additional channel state information processing unit includes the released channel state information processing unit.

In some examples of the method, apparatuses, and non-transitory computer-readable medium described herein, the configuration may include operations, features, means, or instructions for identify a first previously allocated channel state information processing unit associated with an uplink grant and a second previously allocated channel state information processing unit associated with a prior downlink grant, determine that the prior downlink grant may have a lower priority than the uplink grant, and release the second previously allocated channel state information processing unit based on the determined priority, where the additional channel state information processing unit includes the released channel state information processing unit.

In some examples of the method, apparatuses, and non-transitory computer-readable medium described herein, the configuration includes a second configuration for the UE a set of previously allocated channel state information processing units based on determining that the set of previously allocated channel state information processing units may be associated with a second downlink grant, and where the additional channel state information processing unit includes the released set of channel state information processing units.

In some examples of the method, apparatuses, and non-transitory computer-readable medium described herein, the configuration includes a second configuration for the UE to refrain from releasing a set of previously allocated channel state information processing units based on determining that the set of previously allocated channel state information processing units may be associated with a second downlink grant, and where allocating the set of channel state information processing units may be based on refraining from releasing the set of previously allocated channel state information processing units.

In some examples of the method, apparatuses, and non-transitory computer-readable medium described herein, the configuration may include operations, features, means, or instructions for identify a first set of previously allocated channel state information processing units associated with a second downlink grant and a second set of previously allocated channel state information processing units associated with a third downlink grant, determine that the second downlink grant may have a higher priority than the third downlink grant, and release the first set of previously allocated channel state information processing units based on determining that the second downlink grant may have the higher priority than the third downlink grant, where the additional channel state information processing unit includes the released set of channel state information processing units.

In some examples of the method, apparatuses, and non-transitory computer-readable medium described herein, a priority associated with the second downlink grant may be based on a type of indication associated with the second downlink grant and a priority associated with the third downlink grant may be based on the type of indication associated with the third downlink grant, and where allocating the set of channel state information processing units may be based on the priority associated with the second downlink grant and the priority associated with the third downlink grant.

In some examples of the method, apparatuses, and non-transitory computer-readable medium described herein, the type of indication includes a type 1 indication or a type 2 indication. In some examples of the method, apparatuses, and non-transitory computer-readable medium described herein, the type 2 indication may have a higher priority than the type 1 indication.

In some examples of the method, apparatuses, and non-transitory computer-readable medium described herein, receiving the channel state information report further may include operations, features, means, or instructions for receiving the channel state information report via a physical uplink shared channel or a physical uplink control channel. In some examples of the method, apparatuses, and non-transitory computer-readable medium described herein, transmitting the downlink grant further may include operations, features, means, or instructions for transmitting the downlink grant via a physical downlink control channel.

In some examples of the method, apparatuses, and non-transitory computer-readable medium described herein, transmitting the downlink grant further may include operations, features, means, or instructions for transmitting the downlink grant via downlink control information. In some examples of the method, apparatuses, and non-transitory computer-readable medium described herein, the downlink grant may be associated with an ultra reliable low latency communication.

DETAILED DESCRIPTION

Figure 1:
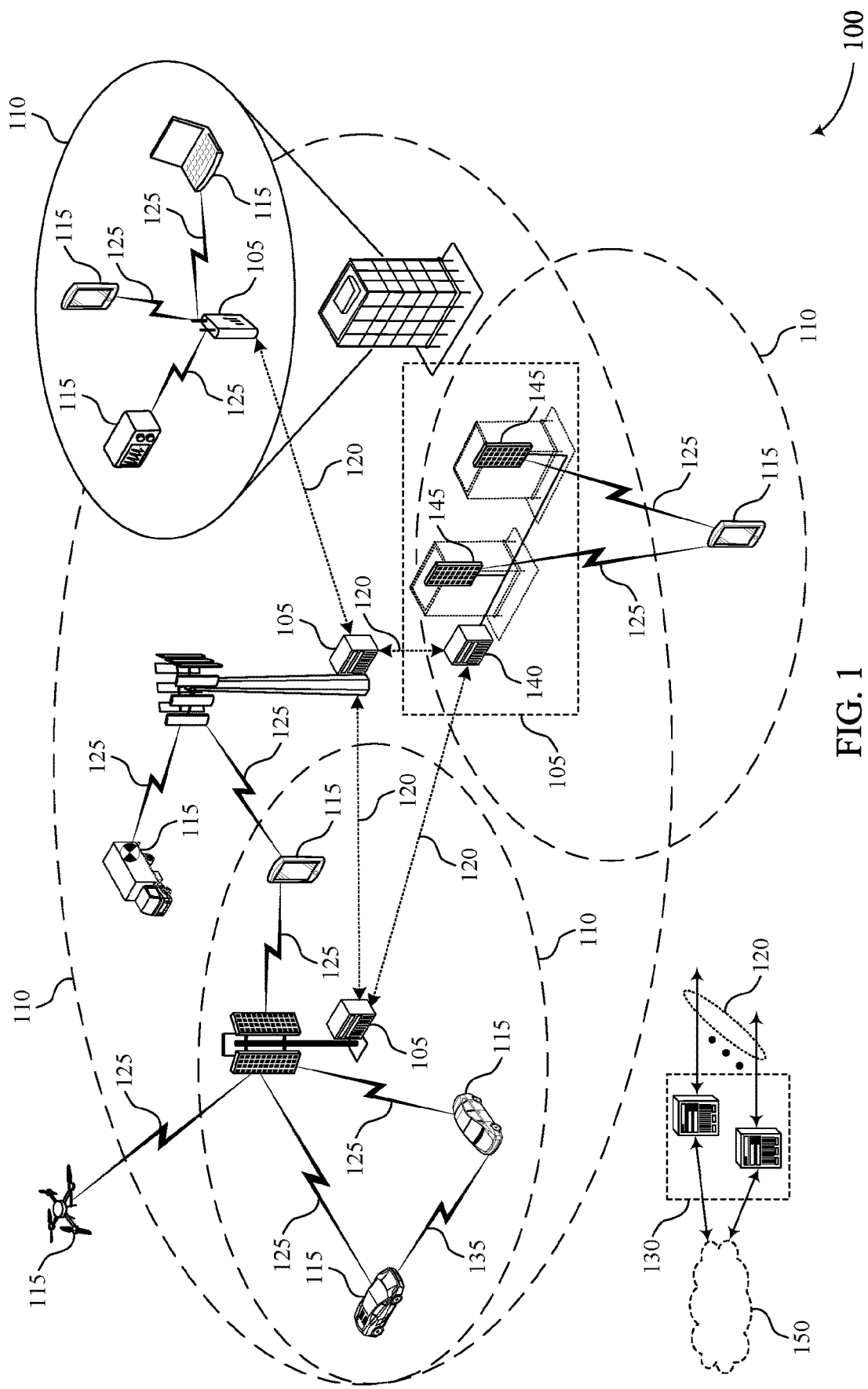
FIG. 1 illustrates an example of a wireless communications system that supports channel state information processing unit assignment for channel state information reporting in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies. Channel state information resources may be measured by a UE to estimate channel quality between a base station and UE, among other purposes, and the channel quality may be indicated by one or more measured parameters (e.g., channel quality indicator, precoding matrix indicator, rank indicator, layer one reference signal received power). The UE may transmit a channel state information report to the base station indicating the channel quality information that the base station may use for performing one or more operations, such as data transmissions. The base station may use this report for scheduling transmissions in the future.

Other different channel state information reporting techniques may, however, be deficient. In other different wireless communications systems, a UE may have a limited number of channel state information processing units for channel state information computations. In some cases, a number of channel state information processing units may be equal to a number of simultaneous channel state information calculations supported by the UE. In some cases, the channel state information processing units may be related to a calculation engine that may perform channel state information calculations that are reported in the channel state information report. When generating a channel state information report, the UE may allocate one or more available channel state information processing units to perform one or more channel state information calculations for the channel state information report. For example, the UE may determine the number of channel state information processing units associated with computing the channel state information based on a load of the channel state information computation. In some cases, the number of channel state information processing units may remain occupied until the channel state information is reported. In such cases with these other different techniques, there may not be enough channel state information processing units available because the UE may have already allocated some of the channel state information processing units for performing ongoing channel state information calculations for generating one or more other channel state information reports.

In these other different techniques, the UE may update the available channel state information processing units associated with the channel state information reporting (and not others), and may skip one or more unavailable channel state information processing units. In such cases, the reported channel state information may not be updated, potentially resulting in decreased data throughput. Thus, there exists a need to update channel state information reporting for other different techniques when the number of available channel state information processing units is insufficient for computing the channel state information, among other conditions.

One or more aspects of the present disclosure address, among other aspects, implementing one or more rules to efficiently allocate a number of channel state information processing units to compute channel state information reports, for example, associated with a low latency communication. In some examples, a base station may configure a UE to allocate channel state information processing units for computing channel state information. The base station may transmit the configuration to the UE. In some cases, after transmitting the configuration, the base station may transmit a downlink grant triggering a channel state information report. The UE may receive the downlink grant and based on receiving a trigger to compute channel state information, which may be in or based on the downlink grant, the UE may calculate a number (e.g., a total number) of channel state information processing units associated with transmitting the channel state information report. The UE may also determine an available number of channel state information processing units, and may determine whether that the available number of channel state information processing units is less than the total number of channel state information processing units associated with transmitting the channel state information report. That is, the UE may determine whether the unoccupied channel state information processing units of the UE are sufficient to compute channel state information and transmit the triggered channel state information report.

In the case where the UE determines that the unoccupied (e.g., available) channel state information processing units are insufficient for transmitting the channel state information report, the UE may release one or more additional channel state information processing units based on one or more rules (such as rules configured by the base station or defined rules for the UE such as preconfigured rules). In some examples, the one or more rules may be based on whether previously occupied channel state information processing units are associated with a downlink grant, an uplink grant, a high priority downlink grant, a high priority uplink grant, or any combination. The UE may allocate a set of channel state information processing units by using the available channel state information processing units and at least one released channel state information processing unit. The UE may then transmit the channel state information report based on the allocated set of channel state information processing units.

Aspects of the disclosure are initially described in the context of a wireless communications system. Aspects of the disclosure are further described in the context of an additional wireless communications system and process flows. Aspects of the disclosure are further illustrated by and described with reference to apparatus diagrams, system diagrams, and flowcharts that relate to channel state information processing unit assignment for channel state information reporting.

FIG. 1 illustrates an example of a wireless communications system 100 that supports channel state information processing unit assignment for channel state information reporting in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed)

frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at one or more orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the radio resource control protocol layer may provide establishment, configuration, and maintenance of the radio resource control connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In other different wireless communications systems a channel state information report may be requested by a base station. For example, the base station may request the channel state information report using one or more downlink grants. Upon receiving the request for the channel state information report, a UE may measure a channel state and may transmit the channel state information report. In other different wireless communications systems, a UE may be provided with a limited number of channel state information processing units for channel state information computations. Upon receiving a request for a channel state information report, the UE may allocate certain number of channel state information processing units to compute the channel state information. In some cases, the number of channel state information processing units may remain occupied until the channel state information is reported. In wireless communications systems supporting NR, the downlink grants may be used by the base station to trigger channel state information reports for low latency communications. Thus, increased efficiency and reduced latency compared to other different wireless communications systems and enhanced techniques for channel state information reporting may be desired.

One or more aspects of the present disclosure provide for a UE 115 receiving a downlink grant including an indication to report channel state information. The UE 115 may identify, based on the downlink grant, a number of channel state information processing units associated with reporting the channel state information and may determine that an available number of channel state information processing units is less than the number of channel state information processing units. In some cases, the UE 115 may allocate (e.g., release), based on the determining, a set of channel state information processing units for transmitting a channel state information report, the set of channel state information processing units including the available number of channel state information processing units and one or more additional channel state information processing units. The UE 115 may then transmit the channel state information report based on the set of channel state information processing units. Thus, providing an enhanced method to allocate channel state information processing units for channel state information report transmission, as described herein, may result in improved throughput, increased system efficiency, and improved user experience, among other benefits.

Figure 2:
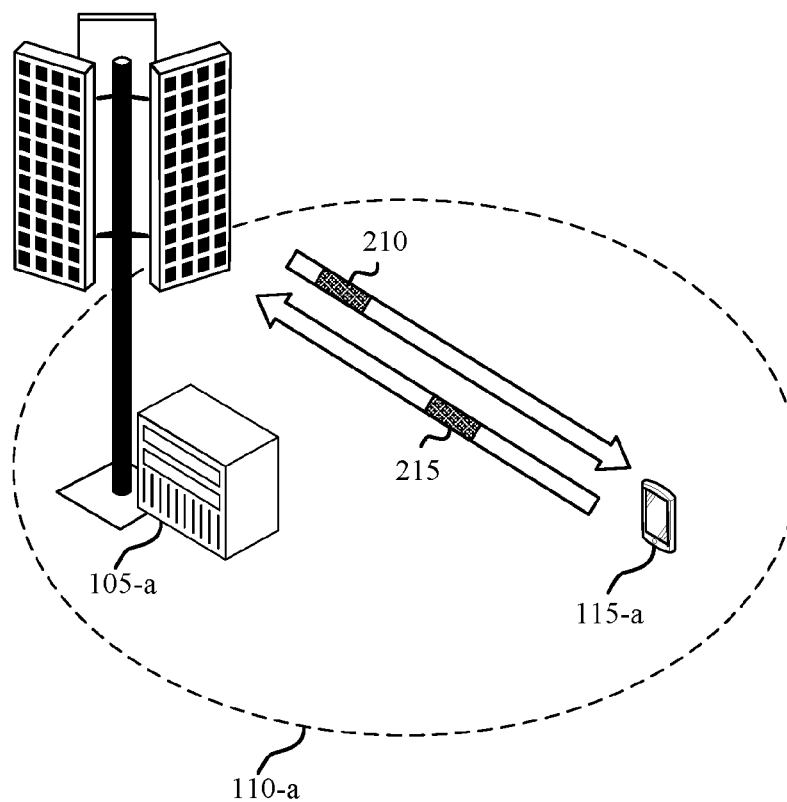
FIG. 2 illustrates an example of a wireless communications system that supports channel state information processing unit assignment for channel state information reporting in accordance with aspects of the present disclosure.
Figure 2:
Figure 2:

FIG. 2 illustrates an example of a wireless communications system 200 that supports channel state information processing unit assignment for channel state information reporting in accordance with aspects of the present disclosure. In some examples, the wireless communications system 200 may implement aspects of wireless communications system 100. The wireless communications system 200 may include a base station 105-a and a UE 115-a within a geographic coverage area 110-a. The base station 105-a and the UE 115-a may be examples of base stations 105 and UEs 115 as described herein. In some examples, the wireless communications system 200 may support multiple radio access technologies including 4G systems such as LTE systems, LTE-A systems, or LTE-A Pro systems, and 5G systems which may be referred to as NR systems or NR communications systems. In some examples, the wireless communications system 200 may implement aspects of the wireless communications system 100 to support improvements to power consumption, spectral efficiency, higher data rates and, in some examples, may promote enhanced efficiency for high reliability and low latency communication operations, among other benefits.

According to one or more aspects of the present disclosure, the UE 115-a may implement one or more rules to efficiently allocate a number of channel state information processing units (e.g., one or more) to compute channel state information reports. For example, UE 115-a may be configured by the base station 105-a to implement the one or more rules, and the UE 115-a may implement the one or more rules to determine the channel state information report using one or more allocated channel state information processing units. Additionally or alternatively, other wireless devices, such as base station 105-a, may implement the one or more rules described herein for improved efficiency and data throughput for system communications, among other benefits.

The base station 105-a may transmit a channel state information reference signal within one or more channel state information resources for measurement by a UE 115-a to estimate channel quality between the base station 105-a and the UE 115-a. The UE 115-a may transmit a channel state information report to the base station indicating the channel quality information that the base station 105 may use, for example, for scheduling subsequent data transmissions.

In other different wireless communications systems, a channel state information reporting may be requested by a base station using downlink grants. For instance, a UE may receive one or more downlink control information messages (e.g., in a physical downlink shared channel, physical downlink control channel, etc.), where each downlink control information message may include an associated physical uplink shared channel for transmitting uplink messages scheduled by the downlink control information message. In some examples, a UE may measure a channel state and may transmit a channel state information report.

According to one or more aspects, channel state information may be included in a physical uplink shared channel for example, as semi-static reporting. In other different communications systems, acknowledgement reporting may be associated with a timeline. That is, a UE may receive a downlink grant and may determine an offset (e.g., K0=0 or K0=a non-zero value) which may indicate a gap between the downlink grant and a physical downlink shared channel. Additionally or alternatively, the UE may determine a second offset (K1) which may indicate to the UE when an acknowledgement or negative acknowledgement associated with the physical downlink shared channel is to be reported to the base station. In some examples, the base station may use the reported acknowledgement or negative acknowledgement to perform link adaptation, among other operations. However, if a link between the UE and the base station is relatively slow, then the base station may receive multiple negative acknowledgements before updating a modulation and coding scheme or other channel characteristics. In some examples, a UE may not include channel state information in the acknowledgement or a negative acknowledgement report to the UE.

Additionally or alternatively, the UE may determine a value of the first offset (K0) implicitly from a time domain resource allocation table included in the downlink grant (e.g., via downlink control information format 1_0 or 1_1 or 1-2). Additionally or alternatively, the UE may determine that a value of the second offset (K1) is indicated explicated in the downlink grant (e.g., via downlink control information format 1_0 or 1_1 or 1-2). Link adaptation via acknowledgement or negative acknowledgement transmission may result in a slow rate, a slow modulation and coding scheme adjustment, a slow transmit power adaptation, a slow adjustment for retransmission when negative acknowledgement is received at the base station, or any combination. In some other different wireless communications systems, no channel state information or channel quality indicator information is included in or associated with any negative acknowledgement. As a result, the base station may not be able to adjust any modulation and coding scheme or rate for retransmission to a UE.

In some wireless communications systems, channel state information or channel quality indicator information feedback may be based on a periodic channel state information feedback or an aperiodic channel state information feedback (triggered by a separate uplink grant). In some examples, the periodic channel state information feedback may not be flexible and may be associated with a periodicity value. Additionally or alternatively, a timeline associated with the aperiodic channel state information feedback may be slower than a timeline associated with acknowledgement or negative acknowledgement transmission. That is, a UE may not be able to transmit an aperiodic channel state information feedback at a slot even if one or more transmission are scheduled at the same slot.

In one example, transmission may be associated with a delay budget such that two transmissions may be possible in a time period. If a first transmission fails, it may be beneficial for the UE to indicate to the base station, a channel state information (indicating adjusted resources or indicating how a link may be adapted for an upcoming transmission). To be able to transmit the channel state information feedback within the time period, the UE may adapt a bundled channel quality indicator and channel state information feedback. For example, a UE (e.g., a UE in other different communications systems) may be configured to associated or bundle channel quality indicator and channel state information feedback with an acknowledgement or negative acknowledgement feedback to allow the base station to perform faster and more accurate modulation and coding scheme adaptation, rate adaptation, transmit power adaption, or a combination In particular, a channel state information report may be triggered by a downlink grant either explicitly (e.g., by an information field in a downlink control information) or implicitly (e.g., by a negative acknowledgement).

In an example wireless communications system supporting low latency communications, such as URLLC, a turbo hybrid automatic repeat request acknowledgment can allow more reliable retransmission. For example, with turbo hybrid automatic repeat request acknowledgment, a retransmission may be able to generate 10^-5 reliability and low latency (say 5 ms). With legacy hybrid automatic repeat request acknowledgment, more retransmission may be needed as the modulation and coding scheme adaptation, rate adaptation, and transmit power adaption is slower. In some examples, the UE may identify different channel state information computations (e.g., channel quality indicator, pre-coding matric indicator, rank indicator) and the channel state information processing may take longer than the timeline for transmission of a negative acknowledgement. To provide the UE with an extended timeline to process the channel state information, the base station may trigger channel state information reporting using a downlink grant.

Other different communications systems may provide for a limited number of channel state information processing units (at the UE) for channel state information computations. In some cases, upon receiving a request for a channel state information report, the UE may allocate a certain number of channel state information processing units to compute the channel state information. For example, the UE may determine the number of channel state information processing units to compute the channel state information based on a load associated with computing the channel state information. In some cases, however, the number of channel state information processing units may remain occupied until an associated channel state information is reported. In wireless communications systems supporting NR, downlink grant may be used to trigger channel state information reports for low latency communications. Thus, there exists a need to update channel state information reporting when the number of available channel state information processing units is insufficient for computing the channel state information.

In some examples, a UE may indicate a number of supported simultaneous channel state information calculations as N_CPU. If a UE supports N_CPU simultaneous channel state information calculations, then the UE may have N_CPU channel state information processing units for processing the channel state information reports across all configured cells. If L channel state information processing units are occupied for calculation of channel state information reports in a given OFDM symbol (i.e., if the calculation is performed on symbol by symbol basis), then the UE may determine that there are N_CPU−L unoccupied channel state information processing units. If N channel state information reports start occupying their respective channel state information processing units on the same OFDM symbol on which N_CPU−L channel state information processing units are unoccupied, where each channel state information report n=0, . . . , N−1 corresponds to O_CPU^((n)), then the UE may not update the N−M requested channel state information reports with lowest priority, where 0≤M≤N is the largest value such that $\Sigma_{n=0}^{M-1} O_{CPU}^{(n)} \leq N_{CPU}-L$ holds. That is, other different wireless communications systems do not provide for UEs to update the channel state information reports for the unavailable channel state information processing units.

In some aspects, other different wireless communications systems may provide that a UE may not be expected to be configured with an aperiodic channel state information trigger state including more than N_CPU reporting settings. Additionally or alternatively, processing of a channel state information report may occupy a number of channel state information processing units for a number of symbols as follows: O_CPU=0 for a channel state information report with CSI-ReportConfig with a higher layer parameter reportQuantity set to "none" and CSI-RS-ResourceSet with higher layer parameter trs-Info configured as O_CPU=1 for a channel state information report with CSI-ReportConfig with higher layer parameter reportQuantity set to "cri-RSRP," "ssb-Index-RSRP" or "none: (and CSI-RS-ResourceSet with higher layer parameter trs-Info not configured).

In some examples, for a channel state information report with CSI-ReportConfig with higher layer parameter reportQuantity set to "cri-RI-PMI-CQI," "cri-RI-i1," "cri-RI-i1-CQI," "cri-RI-CQI," or "cri-RI-LI-PMI-CQI," if a channel state information report is aperiodically triggered without transmitting a physical uplink shared channel with either transport block or hybrid automatic repeat request acknowledgment or both when L=0 channel state information processing units are occupied, where the channel state information corresponds to a single channel state information with wideband frequency-granularity and to at most 4 channel state information reference signal ports in a single resource without channel state information report and where codebookType is set to "typeI-SinglePanel" or where reportQuantity is set to "cri-RI-CQI," O_CPU=N_CPU, otherwise, O_CPU=K_s, where K_s is the number of channel state information reference signal resources in the channel state information reference signal resource set for channel measurement.

As described herein, one or more channel state information processing units may be occupied for a period of time (for processing a channel state information), and the channel state information processing units may then be released. For a channel state information report with CSI-ReportConfig with higher layer parameter reportQuantity not set to "none," the channel state information processing units may be occupied for a number of OFDM symbols as follows: A periodic or semi-persistent channel state information report (excluding an initial semi-persistent channel state information report on physical uplink shared channel after a physical downlink control channel triggering the channel state information report) occupies channel state information processing units from a first symbol of an earliest one of each channel state information reference signal or channel state information interference measurement or synchronization signal block resource for channel or interference measurement, respective latest channel state information reference signal or channel state information interference measurement or synchronization signal block occasion no later than the corresponding channel state information reference resource, until the last symbol of the physical uplink shared channel or physical uplink control channel carrying the channel state information report.

In some examples, an aperiodic channel state information report may occupy one or more channel state information processing units from, for example, a first symbol after a physical downlink control channel triggering the channel state information report until, for example, a last symbol of the physical uplink shared channel carrying the channel state information report. An initial semi-persistent channel state information report on the physical uplink shared channel after the physical downlink control channel trigger may occupy channel state information processing unit(s) from the first symbol after the physical downlink control channel until the last symbol of the physical uplink shared channel carrying the channel state information report. In some examples, an aperiodic channel state information may be triggered by a downlink grant. In some cases, the channel state information triggered by the downlink grant may occupy a number of channel state information processing units. The number of channel state information processing units may be dependent on the workload needed at the UE to compute the channel state information. According to one or more aspects, an aperiodic channel state information may be implicitly triggered by a downlink grant. For example, a UE may decode a physical downlink shared channel associated with a downlink grant, and may transmit a channel state information report based on decoding the physical downlink shared channel.

In some implementations, if the UE determines that a channel quality indicator has to be reported or if the UE determines extra resources compared to an initial or current transmission needed to reach a target block error rate after reception of the next transmission, then number of channel state information processing units may be determined as X. If on the other hand, the UE determines that channel quality indicator, rank indicator, and pre-coding matric indicator are to be reported, then the number of channel state information processing units may be determined as Y, where Y>X.

In some examples, the value of X and Y can be fixed and specified. In some examples, the value of X and Y may be reported by the UE as a UE capability. In another implementation, the UE may determine that a downlink triggered channel state information may occupy all available channel state information processing units. When a channel state information is triggered by a downlink grant (either implicitly or explicitly), and the channel state information is to be reported on physical uplink control channel, then the occupied channel state information processing units may be released after the last symbol of the corresponding physical uplink control carrying the report.

In some cases, for a channel state information report with CSI-ReportConfig with higher layer parameter reportQuantity not set to "none," the UE may determine that the channel state information processing units are occupied for a number of OFDM symbols. For example, the UE may determine that an aperiodic channel state information report may occupy channel state information processing units from the first symbol after the physical downlink control channel triggering the channel state information report until the last symbol of a physical uplink shared channel or physical uplink control channel carrying the report.

In some examples, if the number of unoccupied channel state information processing units is smaller than the O_CPU needed for a new requested channel state information, then the UE may update a number of channel state information processing units. In some examples, the downlink triggered channel state information report may be associated with urgent transmissions (e.g. URLLC) or high-priority channels. In such cases, if the available number of channel state information processing units is not sufficient, then the channel state information reporting procedure may be updated.

According to one or more aspects of the present disclosure, a UE 115-a may implement one or more rules to efficiently allocate a number of channel state information processing units to compute channel state information reports, for example, associated with a low latency communication. In some examples, the UE 115-a may receive a downlink grant 210 triggering a channel state information report. Upon receiving a trigger to compute the channel state information, the UE 115-a may calculate a number of channel state information processing units associated with transmitting the channel state information report. The UE 115-a may also determine an available number of channel state information processing units and may determine that the available number of channel state information processing units is less than the number of channel state information processing units associated with transmitting the channel state information report. In some examples, the UE 115-a may allocate a set of channel state information processing units by releasing at least one additional channel state information processing units (or previously allocated channel state information processing units). In some examples, the UE 115-a may allocate the set of channel state information processing units to transmit the channel state information report (such that there are sufficient channel state information processing units for transmitting the channel state information report). In some aspects, the UE 115-a may then transmit the channel state information report 215 using the set of channel state information processing units.

In one example, the UE 115-a may process a downlink triggered channel state information in the same was as other channel state information reports. That is, if the UE 115-a determines that sufficient channel state information processing units are not available, then the UE may update a subset of (e.g., less than all) channel state information processing units to report the downlink triggered channel state information. In some cases, the UE 115-a may update the subset of the channel state information processing units.

In some examples, if L channel state information processing units are occupied for calculation of channel state information reports in a given OFDM symbol, then the UE may have N_CPU−L unoccupied channel state information processing units. If N channel state information reports start occupying their respective channel state information processing units on the same OFDM symbol on which N_CPU−L channel state information processing units are unoccupied, where each CSI report n=0, . . . , N−1 corresponds to $O\_CPU\char`\^((n))$, then the UE may not update the N−M requested channel state information reports with lowest priority, where 0≤M≤N is the largest value such that $\Sigma_{n=0}^{M-1} O_{CPU}^{(n)} \leq N_{CPU} - L$ holds.

In some examples, the UE 115-a may determine that downlink and uplink grants triggering channel state information are to be transmitted together. That is, the UE 115-a may determine that the uplink grant is received concurrently or simultaneously with the downlink grant based on a last symbol of a physical downlink control channel associated with the downlink grant being the same as a last symbol of a physical downlink control channel associated with the uplink grant. In some examples, the UE 115-*a* may determine that the available number of channel state information processing units is less than a number of channel state information processing units associated with reporting the downlink triggered channel state information. In such a case, the UE 115-*a* may allocate the set of channel state information processing units for transmitting the channel state information report by determining that a remaining number of channel state information processing units are occupied by the channel state information triggered by the downlink grant prior to allocating channel state information processing units triggered by the uplink grant.

Additionally or alternatively, the UE 115-*a* may allocate the set of channel state information processing units for transmitting the channel state information report by determining that a remaining number of channel state information processing units are occupied by the channel state information triggered by the downlink grant after allocating channel state information processing units triggered by the uplink grant. In some examples, the UE 115-*a* may allocate the set of channel state information processing units for transmitting the channel state information report by determining that a remaining number of channel state information processing units are occupied by the channel state information triggered by the downlink grant prior to allocating channel state information processing units triggered by a grant having a lower priority. In some cases, the UE 115-*a* may receive an uplink grant including a second indication to report second channel state information.

The UE 115-*a* may determine, based on the uplink grant, a number of channel state information processing units associated with reporting the second channel state information, and may further determine that the uplink grant is associated with the same priority as the downlink grant. In such an example, the UE 115-*a* may identify the available number of channel state information processing units based on determining that the uplink grant is associated with the same priority as the downlink grant, after allocating the number of channel state information processing units for reporting the second channel state information. Alternatively, the UE 115-*a* may identify the available number of channel state information processing units based on determining that the uplink grant is associated with the same priority as the downlink grant, before allocating the number of channel state information processing units for reporting the second channel state information.

According to one or more aspects, the UE 115-*a* may determine that an available number of channel state information processing units associated with a downlink triggered channel state information reporting is less than a number of channel state information processing units associated with the downlink triggered channel state information reporting. For example, the UE 115-*a* may determine that four channel state information processing units are needed for downlink triggered channel state information report and the UE 115-*a* may further determine that two channel state information processing units are unoccupied. In such a case, the UE 115-*a* may implement one or more rules to release two (or at most two) channel state information processing units to accommodate the downlink triggered channel state information reporting. In some cases, the one or more rules may define different priorities associated with releasing the occupied channel state information processing units.

In one example, the UE 115-*a* may be configured to identify whether one or more occupied (or previously allocated) channel state information processing units are associated with a previous downlink triggered channel state information report. In one example, if the UE 115-*a* determines that the occupied (or previously allocated) channel state information processing units are associated with a previous downlink triggered channel state information report, then the UE 115-*a* may release one or more occupied (or previously allocated) channel state information processing units. Alternatively, if the UE 115-*a* determines that the occupied (or previously allocated) channel state information processing units are associated with a previous downlink triggered channel state information report, then the UE 115-*a* may not release any occupied (or previously allocated) channel state information processing units. In such cases, if the UE 115-*a* determines that the remaining channel state information processing units are not sufficient, then the UE 115-*a* may update the available channel state information processing units with channel state information for downlink triggered reports. Additionally or alternatively, if the UE 115-*a* determines that the occupied (or previously allocated) channel state information processing units are associated with a previous downlink triggered channel state information report, then the UE 115-*a* may release one or more occupied (or previously allocated) channel state information processing units upon determining that the previous downlink triggered channel state information report is associated with a lower priority.

In some cases, the UE 115-*a* may be configured to identify whether one or more occupied (or previously allocated) channel state information processing units are associated with an uplink grant. Upon determining that the one or more occupied (or previously allocated) channel state information processing units are associated with the uplink grant, the UE 115-*a* may release channel state information processing units starting from the channel state information processing units associated with an earliest or a latest triggered reporting. Additionally or alternatively, upon determining that the one or more occupied (or previously allocated) channel state information processing units are associated with the uplink grant, the UE 115-*a* may release channel state information processing units based on a type of reporting and one or more reporting parameters. In some examples, the one or more reporting parameters may include a channel quality indicator, a pre-coding matrix indicator, a rank indicator, or any combination thereof. In some examples, the type of reporting may include periodic channel state information reporting, semi-persistent channel state information reporting, aperiodic channel state information reporting, or any combination thereof.

Additionally or alternatively, upon determining that the one or more occupied (or previously allocated) channel state information processing units are associated with the uplink grant, the UE 115-*a* may release channel state information processing units according to a release decision at the UE 115-*a*. In some examples, upon determining that the one or more occupied (or previously allocated) channel state information processing units are associated with the uplink grant, the UE 115-*a* may release channel state information processing units based on a priority indicated in the uplink grant. Additionally or alternatively, if the UE 115-*a* determines that a first subset of the one or more occupied (or previously allocated) channel state information processing units are associated with a prior downlink grant and a second subset of the one or more occupied (or previously allocated) channel state information processing units are associated with an uplink grant, then UE 115-a may release the first subset of channel state information processing units or the second subset of channel state information processing units based on a priority of the prior downlink grant and the uplink grant.

According to one or more aspects, the UE 115-a may determine that a channel state information report is triggered by a downlink grant, and the UE 115-a may suspend all previous channel state information reports triggered by uplink grants. In such an example, if the UE 115-a determines that the available channel state information processing units (i.e., channel state information processing units available after suspending the channel state information processing units associated with the uplink grants) are not sufficient, then the UE 115-a may release one or more previously allocated channel state information processing units associated with a prior downlink grant. For instance, the UE 115-a may release all of the previously allocated channel state information processing units associated with the prior downlink grant.

Alternatively, the UE 115-a may release none of the previously allocated channel state information processing units associated with the prior downlink grant. In some examples, UE 115-a may release one or more of the previously allocated channel state information processing units associated with a prior downlink grant upon determining that the prior downlink grant is associated with a lower priority. In some examples, a priority associated with a second downlink grant may be based on a type of indication associated with the second downlink grant and a priority associated with a third downlink grant may be based on the type of indication associated with the third downlink grant. In such an example, the UE 115-a may allocate the set of channel state information processing units for transmitting the channel state information report based on the priority associated with the second downlink grant and the priority associated with the third downlink grant. In some cases, the type of indication may include a type 1 indication or a type 2 indication, where the type 2 indication may have a higher priority than the type 1 indication.

Figure 3:
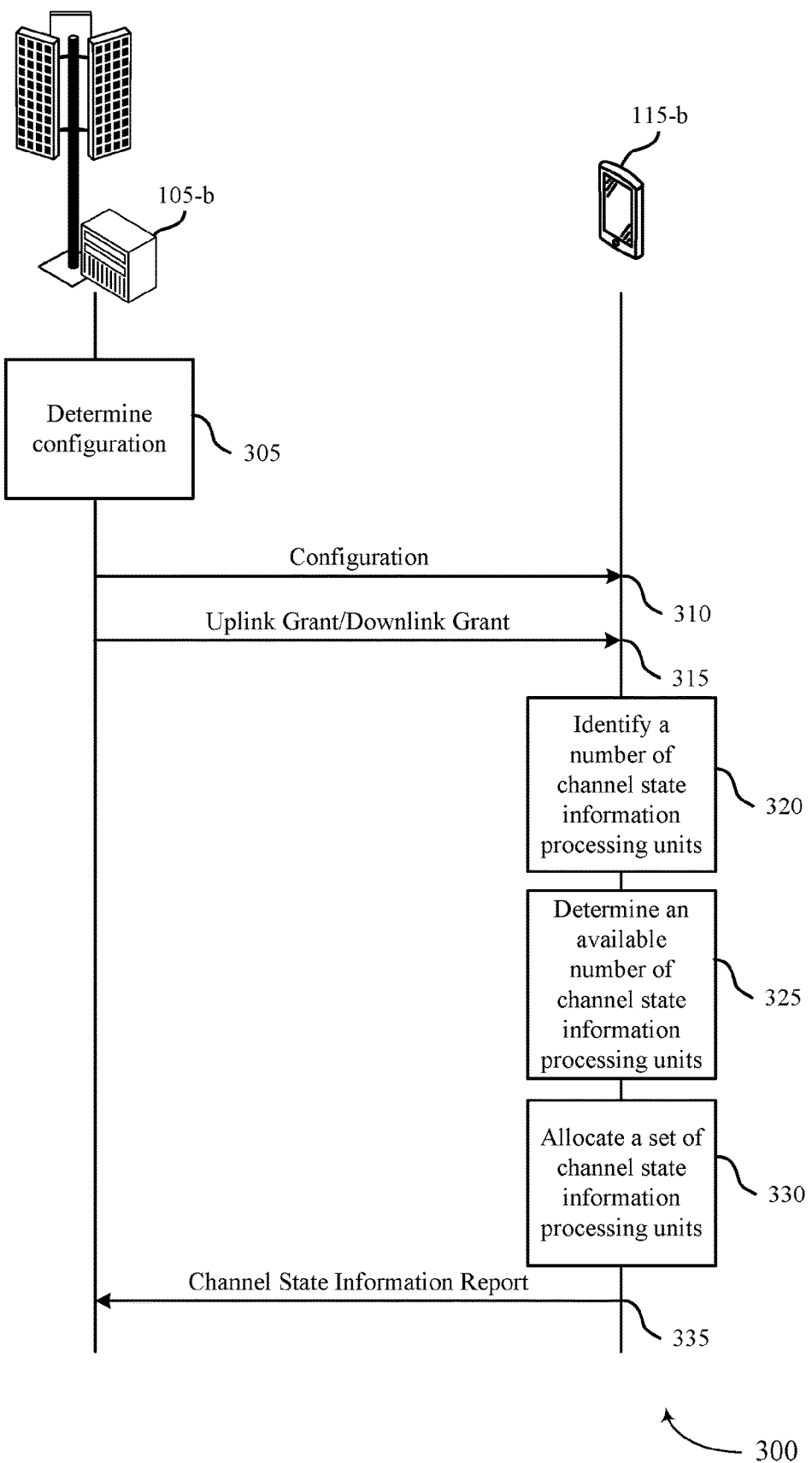
FIG. 3 illustrates an example of a process flow that supports channel state information processing unit assignment for channel state information reporting in accordance with aspects of the present disclosure.

FIG. 3 illustrates an example of a process flow 300 that supports channel state information processing unit assignment for channel state information reporting in accordance with aspects of the present disclosure. In some examples, the process flow 300 may implement aspects of the wireless communications system 100 and 200 described with reference to FIGS. 1 and 2, respectively. For example, the process flow 300 may be based on one or more rules for assigning channel state information processing units for channel state information reporting. The process flow 300 may be implemented by the UE 115-b and the base station 105-b for reduced power consumption, and may promote low latency for wireless communications supporting high priority channels, among other benefits. The base station 105-b and the UE 115-b may be examples of a base station 105 and a UE 115, as described with reference to FIGS. 1 and 2.

In the following description of the process flow 300, the operations between the base station 105-b and the UE 115-b may be transmitted in a different order than the example order shown, or the operations performed by the base station 105-b and the UE 115-b may be performed in different orders or at different times. Some operations may also be omitted from the process flow 300, and other operations may be added to the process flow 300.

At 305, the base station 105-b may determine a configuration for the UE 115-b to allocate a set of channel state information processing units based on an available number of channel state information processing units and a number of channel state information processing units associated with reporting channel state information. At 310, the base station 105-b may transmit the configuration for the UE 115-b to allocate the set of channel state information processing units.

At 315, the UE 115-b may receive a downlink grant including an indication to report channel state information. In some cases, the UE 115-b may receive the downlink grant, for example, via a physical downlink control channel. The UE 115-b may, in some examples, concurrently receive an uplink grant including a second indication to report second channel state information.

At 320, the UE 115-b may identify, based on the downlink grant, a number of channel state information processing units associated with reporting the channel state information. In some cases, the number of channel state information processing units may be identified based on a capability associated with the UE 115-b, among other factors. In some cases, the number of channel state information processing units may be predefined for the UE 115-b.

At 325, the UE 115-b may determine an available number of channel state information processing units. The UE 115-b may determine that the available number of channel state information processing units is less than the number of channel state information processing units, such as channel state information processing units associated with transmitting channel state information. In some cases, the UE 115-b may determine the available number of channel state information processing units before allocating a number of channel state information processing units for reporting the second channel state information associated with the uplink grant. Additionally or alternatively, the UE 115-b may determine the available number of channel state information processing units after allocating a number of channel state information processing units for reporting the second channel state information associated with the uplink grant.

In some cases, the UE 115-b may determine that the downlink grant is associated with a higher priority than the uplink grant. The UE 115-b may then determine the available number of channel state information processing units, based on determining that the downlink grant is associated with the higher priority than the uplink grant, before allocating the number of channel state information processing units for reporting the second channel state information.

At 330, the UE 115-b may allocate, based on the determining (at 325), a set of channel state information processing units for transmitting a channel state information report, the set of channel state information processing units including the available number of channel state information processing units and one or more additional channel state information processing units.

At 335, the UE 115-b may transmit the channel state information report based on the set of channel state information processing units. In some cases, the UE 115-b may transmit the channel state information report via a physical uplink shared channel or a physical uplink control channel.

The operations performed by the base station 105-b and the UE 115-b as part of, but not limited to, process flow 300 may provide improvements to wireless communications based on efficient allocation of channel state information processing units. Furthermore, the operations performed by the base station 105-b and the UE 115-b as part of, but not limited to, process flow 300 may provide benefits and enhancements to the operation of the UE 115-b. For example, the described allocation methods for channel state information processing units in the process flow 300 may support reduced power consumption and increased efficiency, among other advantages.

Figure 4:
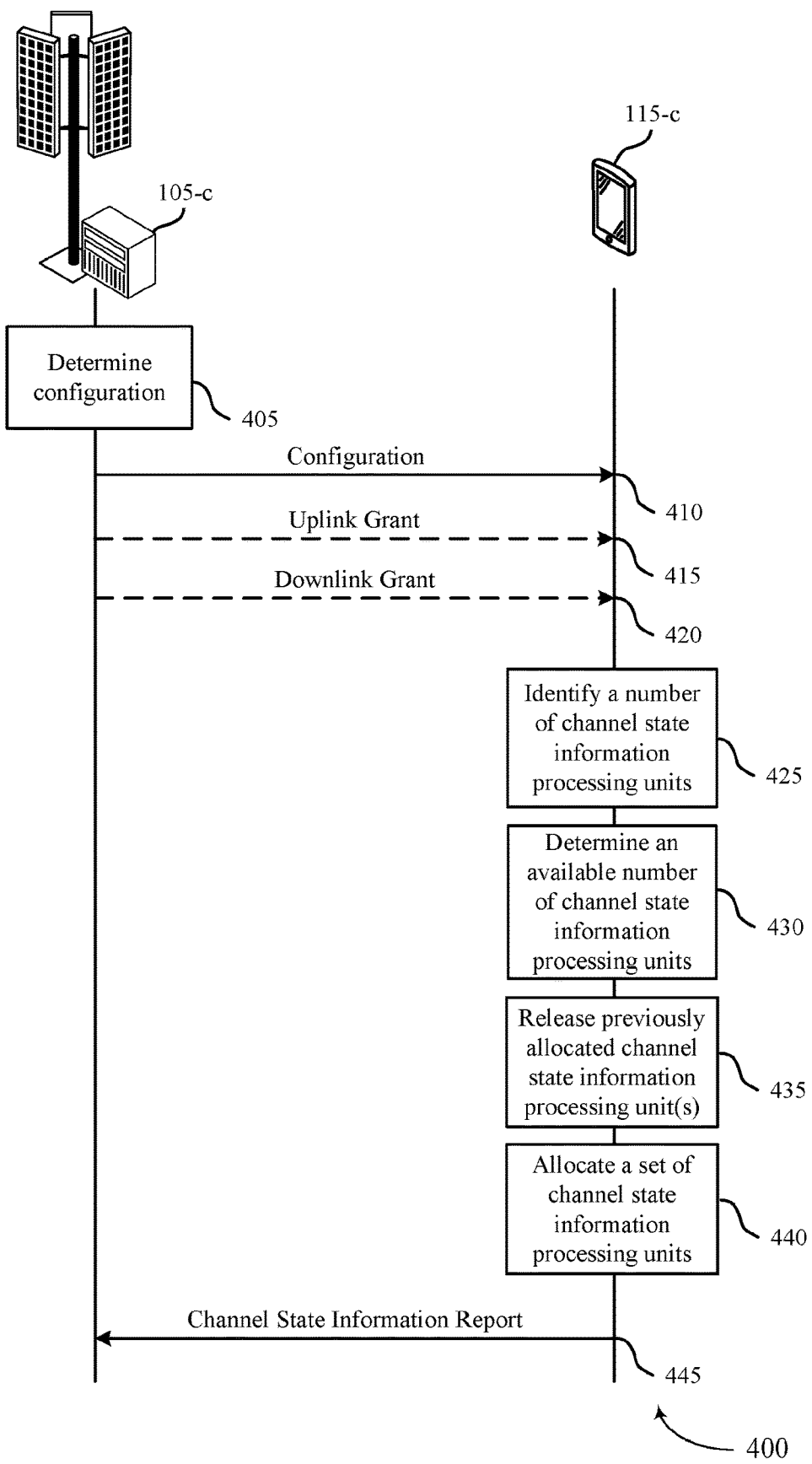
FIG. 4 illustrates an example of a process flow that supports channel state information processing unit assignment for channel state information reporting in accordance with aspects of the present disclosure.

FIG. 4 illustrates an example of a process flow 400 that supports channel state information processing unit assignment for channel state information reporting in accordance with aspects of the present disclosure. In some examples, the process flow 400 may implement aspects of the wireless communications system 100 and 200 described with reference to FIGS. 1 and 2, respectively. For example, the process flow 400 may be based on one or more rules for assigning channel state information processing units for channel state information reporting. The process flow 400 may be implemented by the UE 115-c and the base station 105-c for reduced power consumption, and may promote low latency for wireless communications, among other benefits. The base station 105-c and the UE 115-c may be examples of a base station 105 and a UE 115, as described with reference to FIGS. 1 and 2.

In the following description of the process flow 400, the operations between the base station 105-c and the UE 115-c may be transmitted in a different order than the example order shown, or the operations performed by the base station 105-c and the UE 115-c may be performed in different orders or at different times. Some operations may also be omitted from the process flow 400, and other operations may be added to the process flow 400.

At 405, the base station 105-c may determine a configuration for the UE 115-c to allocate a set of channel state information processing units based on an available number of channel state information processing units and a number of channel state information processing units associated with reporting channel state information. At 410, the base station 105-c may transmit the configuration for the UE 115-c to allocate the set of channel state information processing units. In some examples, the UE 115-c may receive the configuration and may allocate one or more channel state information processing units according to the configuration.

At 415, the UE 115-c may optionally receive an uplink grant including an indication to report channel state information. At 420, the UE 115-c may optionally receive a downlink grant including an indication to report channel state information. In some cases, the UE 115-c may receive the downlink grant via a physical downlink control channel. In some cases, the UE 115-c may receive the downlink grant after receiving the uplink grant. Although not depicted herein, the UE 115-c may receive the downlink grant prior to receiving he uplink grant.

At 425, the UE 115-c may identify, based on the downlink grant, a number of channel state information processing units associated with reporting the channel state information. In some cases, the number of channel state information processing units may be identified based on a capability associated with the UE 115-c. In some cases, the number of channel state information processing units may be predefined for the UE 115-c.

At 430, the UE 115-c may determine an available number of channel state information processing units. The UE 115-c may also determine that the available number of channel state information processing units is less than the number of channel state information processing units.

At 435, the UE 115-c may identify a first previously allocated channel state information processing unit associated with a first uplink grant and a second previously allocated channel state information processing unit associated with a second uplink grant (not shown). The UE 115-c may determine that the first uplink grant is received before the second uplink grant. The UE 115-c may then release the first previously allocated channel state information processing unit based on determining that the first uplink grant is received before the second uplink grant.

Additionally or alternatively, the UE 115-c may identify a previously allocated channel state information processing unit associated with the uplink grant and may determine a type of reporting associated with the previously allocated channel state information processing unit. In some cases. the type of reporting may include periodic channel state information reporting, semi-persistent channel state information reporting, aperiodic channel state information reporting, or any combination thereof. The UE 115-c may release the previously allocated channel state information processing unit based on the type of reporting.

Additionally or alternatively, the UE 115-c may identify a previously allocated channel state information processing unit associated with the uplink grant and may determine one or more reporting parameters associated with the previously allocated channel state information processing unit. In some cases, the one or more reporting parameters may include a channel quality indicator, a pre-coding matrix indicator, a rank indicator, or any combination thereof. The UE 115-c may then release the previously allocated channel state information processing unit based on the one or more reporting parameters.

In some examples, the UE 115-c may identify a previously allocated channel state information processing unit associated with the uplink grant and may determine a priority associated with the uplink grant. The UE 115-c may then release the previously allocated channel state information processing unit based on the determined priority.

At 440, the UE 115-c may allocate, based on the determining (at 430) and the releasing (at 434), a set of channel state information processing units for transmitting a channel state information report. In some cases, the set of channel state information processing units may include the available number of channel state information processing units and one or more additional channel state information processing units. In some cases, an additional channel state information processing unit may include a released channel state information processing unit (as described in 435).

At 445, the UE 115-c may transmit the channel state information report based on the set of channel state information processing units. In some cases, the UE 115-c may transmit the channel state information report via a physical uplink shared channel or a physical uplink control channel.

The operations performed by the base station 105-c and the UE 115-c as part of, but not limited to, process flow 400 may provide improvements to wireless communications based on efficient allocation of channel state information processing units. Furthermore, the operations performed by the base station 105-c and the UE 115-c as part of, but not limited to, process flow 400 may provide benefits and enhancements to the operation of the UE 115-c. For example, the described allocation methods for channel state information processing units in the process flow 400 may support reduced power consumption and increased efficiency, among other advantages.

Figure 5:
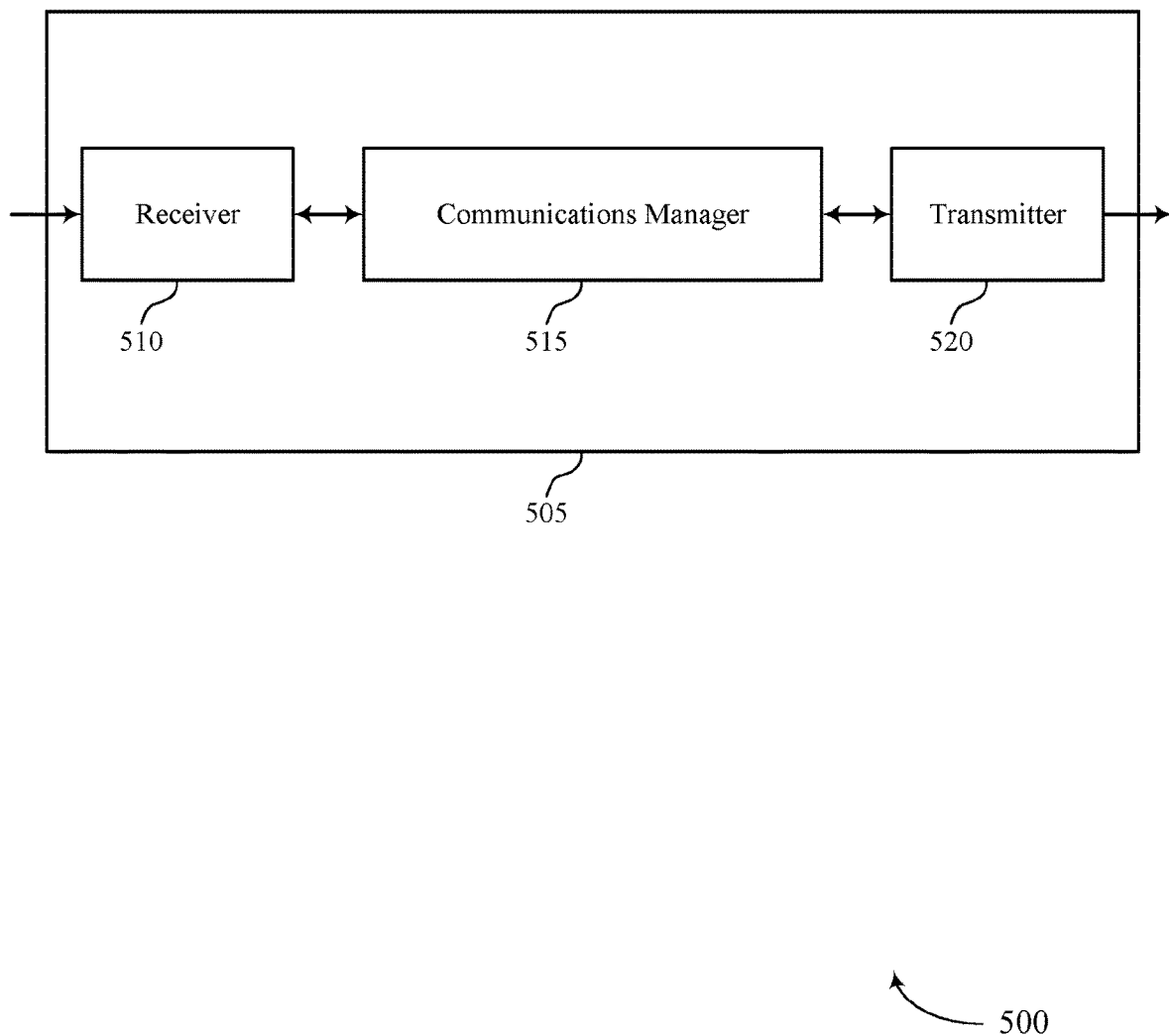
FIGS. 5 and 6 show block diagrams of devices that support channel state information processing unit assignment for channel state information reporting in accordance with aspects of the present disclosure.

FIG. 5 shows a block diagram 500 of a device 505 that supports channel state information processing unit assignment for channel state information reporting in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel state information processing unit assignment for channel state information reporting, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a downlink grant including an indication to report channel state information. The communications manager 515 may identify, based on the downlink grant, a number of channel state information processing units associated with reporting the channel state information. The communications manager 515 may determine that an available number of channel state information processing units is less than the number of channel state information processing units. The communications manager 515 may allocate, based on the determining, a set of channel state information processing units for transmitting a channel state information report, the set of channel state information processing units including the available number of channel state information processing units and one or more additional channel state information processing units. The communications manager 515 may transmit the channel state information report based on the set of channel state information processing units. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515 as described herein may be implemented to realize one or more potential advantages. For example, In some examples, the communications manager 515 may decrease communication latency and enhance channel throughput for wireless communications. The improvements in the communication link (for example, decreasing communication latency and increasing reliability) may further save power and increase battery life at a UE 115 (for example, by reducing complexity and retransmissions.

Figure 6:
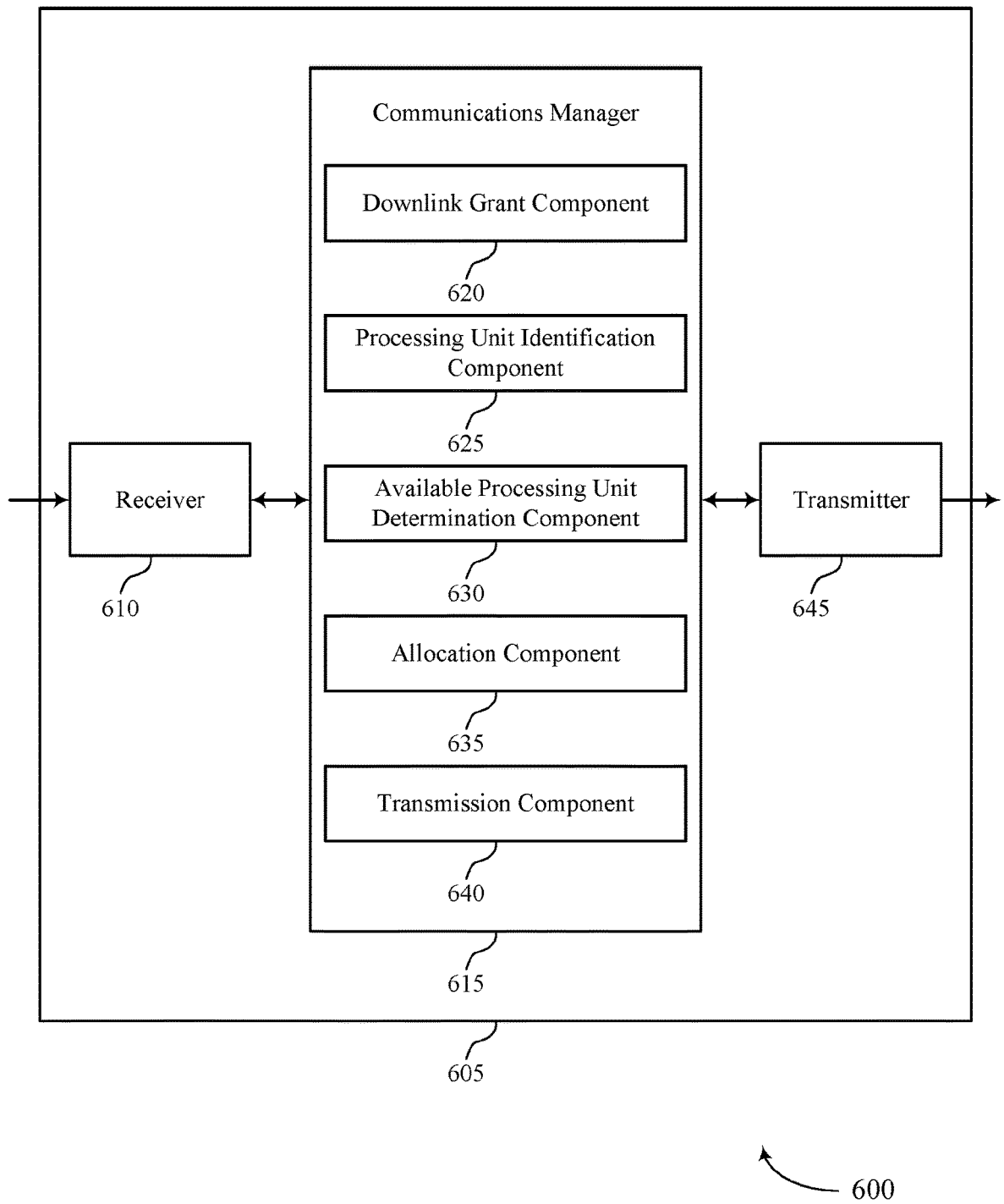

FIG. 6 shows a block diagram 600 of a device 605 that supports channel state information processing unit assignment for channel state information reporting in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to channel state information processing unit assignment for channel state information reporting, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a downlink grant component 620, a processing unit identification component 625, an available processing unit determination component 630, an allocation component 635, and a transmission component 640. The communications manager 615 may be an example of aspects of the communications manager 810 described herein.

The downlink grant component 620 may receive a downlink grant including an indication to report channel state information. The processing unit identification component 625 may identify, based on the downlink grant, a number of channel state information processing units associated with reporting the channel state information. The available processing unit determination component 630 may determine that an available number of channel state information processing units is less than the number of channel state information processing units. The allocation component 635 may allocate, based on the determining, a set of channel state information processing units for transmitting a channel state information report, the set of channel state information processing units including the available number of channel state information processing units and one or more additional channel state information processing units. The transmission component 640 may transmit the channel state information report based on the set of channel state information processing units.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
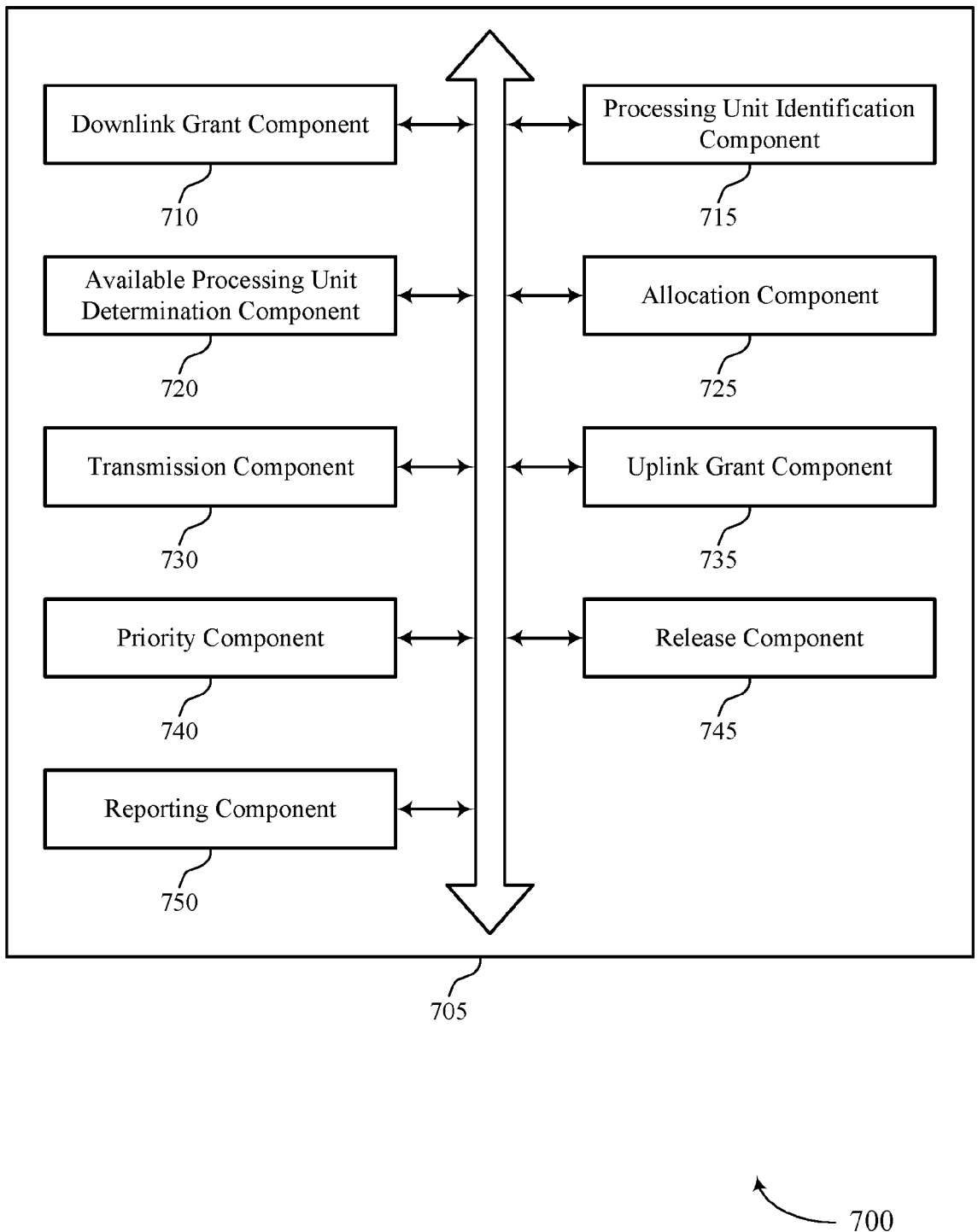
FIG. 7 shows a block diagram of a communications manager that supports channel state information processing unit assignment for channel state information reporting in accordance with aspects of the present disclosure.

FIG. 7 shows a block diagram 700 of a communications manager 705 that supports channel state information processing unit assignment for channel state information reporting in accordance with aspects of the present disclosure. The communications manager 705 may be an example of aspects of a communications manager 515, a communications manager 615, or a communications manager 810 described herein. The communications manager 705 may include a downlink grant component 710, a processing unit identification component 715, an available processing unit determination component 720, an allocation component 725, a transmission component 730, an uplink grant component 735, a priority component 740, a release component 745, and a reporting component 750. Each of these modules may communicate, directly or indirectly, with one another (e.g., via one or more buses).

The downlink grant component 710 may receive a downlink grant including an indication to report channel state information. In some examples, the downlink grant component 710 may receive the downlink grant via a physical downlink control channel. In some examples, the downlink grant component 710 may receive the downlink grant via downlink control information. In some cases, the downlink grant is associated with an ultra reliable low latency communication.

The processing unit identification component 715 may identify, based on the downlink grant, a number of channel state information processing units associated with reporting the channel state information.

In some examples, the processing unit identification component 715 may determine, based on the uplink grant, a number of channel state information processing units associated with reporting the second channel state information. In some cases, the number of channel state information processing units is identified based on a capability associated with the UE. In some cases, the number of channel state information processing units is predefined for the UE.

The available processing unit determination component 720 may determine that an available number of channel state information processing units is less than the number of channel state information processing units. The allocation component 725 may allocate, based on the determining, a set of channel state information processing units for transmitting a channel state information report, the set of channel state information processing units including the available number of channel state information processing units and one or more additional channel state information processing units.

The transmission component 730 may transmit the channel state information report based on the set of channel state information processing units. In some examples, the transmission component 730 may transmit the channel state information report via a physical uplink shared channel or a physical uplink control channel. In some examples, the transmission component 730 may decode a physical downlink shared channel associated with the downlink grant, where transmitting the channel state information report is based on decoding the physical downlink shared channel.

The uplink grant component 735 may receive an uplink grant including a second indication to report second channel state information. In some examples, the available processing unit determination component 720 may determine, based on the uplink grant, a number of channel state information processing units associated with reporting the second channel state information, where the available number of channel state information processing units are identified before allocating the number of channel state information processing units for reporting the second channel state information.

In some examples, the uplink grant component 735 may receive an uplink grant including a second indication to report second channel state information. In some examples, the available processing unit determination component 720 may determine, based on the uplink grant, a number of channel state information processing units associated with reporting the second channel state information, where the available number of channel state information processing units are identified after allocating the number of channel state information processing units for reporting the second channel state information.

In some examples, the available processing unit determination component 720 may determine that the downlink grant is associated with a higher priority than the uplink grant, where the available number of channel state information processing units are identified, based on determining that the downlink grant is associated with the higher priority than the uplink grant, before allocating the number of channel state information processing units for reporting the second channel state information. In some examples, the available processing unit determination component 720 may determine that the uplink grant is associated with a higher priority than the downlink grant, where the available number of channel state information processing units are identified, based on determining that the uplink grant is associated with the higher priority than the downlink grant, after allocating the number of channel state information processing units for reporting the second channel state information. In some examples, the release component 745 may release a previously allocated channel state information processing unit based on determining that the uplink grant is associated with the higher priority than the downlink grant, where allocating the set of channel state information processing units is based on releasing the previously allocated channel state information processing unit.

In some examples, the available processing unit determination component 720 may determine that the uplink grant is associated with the same priority as the downlink grant, where the available number of channel state information processing units are identified, based on determining that the uplink grant is associated with the same priority as the downlink grant, before allocating the number of channel state information processing units for reporting the second channel state information. In some examples, the available processing unit determination component 720 may determine that the uplink grant is associated with the same priority as the downlink grant, where the available number of channel state information processing units are identified, based on determining that the uplink grant is associated with the same priority as the downlink grant, after allocating the number of channel state information processing units for reporting the second channel state information.

In some examples, the available processing unit determination component 720 may determine that the uplink grant is received concurrently with the downlink grant, where identifying the available number of channel state information processing units is based on determining that the uplink grant is received concurrently with the downlink grant. In some examples, the available processing unit determination component 720 may determine that the uplink grant is received concurrently with the downlink grant based on a last symbol of a physical downlink control channel associated with the downlink grant being the same as a last symbol of a physical downlink control channel associated with the uplink grant.

The priority component 740 may determine a priority associated with a previously allocated channel state information processing unit. The release component 745 may release the previously allocated channel state information processing unit based on the determined priority, where the additional channel state information processing unit includes the released channel state information processing unit. In some cases, the additional channel state information processing unit is associated with a prior downlink grant. In some cases, the prior downlink grant has a lower priority than the downlink grant.

In some examples, the allocation component 725 may determine whether the additional channel state information processing unit is associated with a prior downlink grant, where allocating the set of channel state information processing units is based on determining that the additional channel state information processing unit is associated with the prior downlink grant.

In some examples, the allocation component 725 may identify a first previously allocated channel state information processing unit associated with a first uplink grant and a second previously allocated channel state information processing unit associated with a second uplink grant. In some examples, the allocation component 725 may determine that the first uplink grant is received before the second uplink grant. In some examples, the release component 745 may release the first previously allocated channel state information processing unit based on determining that the first uplink grant is received before the second uplink grant, where the additional channel state information processing unit includes the released channel state information processing unit.

In some examples, the allocation component 725 may identify a previously allocated channel state information processing unit associated with an uplink grant. The reporting component 750 may determine a type of reporting associated with the previously allocated channel state information processing unit. In some examples, the reporting component 750 may determine one or more reporting parameters associated with the previously allocated channel state information processing unit.

In some cases, the type of reporting includes periodic channel state information reporting, semi-persistent channel state information reporting, aperiodic channel state information reporting, or any combination thereof. In some cases, the one or more reporting parameters include a channel quality indicator, a pre-coding matrix indicator, a rank indicator, or any combination thereof.

In some examples, the release component 745 may release the previously allocated channel state information processing unit based on the type of reporting, where the additional channel state information processing unit includes the released channel state information processing unit. In some examples, the release component 745 may release the previously allocated channel state information processing unit based on the one or more reporting parameters, where the additional channel state information processing unit includes the released channel state information processing unit.

In some examples, the allocation component 725 may determine that a previously allocated channel state information processing unit is associated with an uplink grant. In some examples, the release component 745 may release the previously allocated channel state information processing unit based on determining that the previously allocated channel state information processing unit is associated with the uplink grant, where the additional channel state information processing unit includes the released channel state information processing unit.

In some examples, the priority component 740 may determine a priority associated with the uplink grant. In some examples, the release component 745 may release the previously allocated channel state information processing unit based on the determined priority, where the additional channel state information processing unit includes the released channel state information processing unit.

In some examples, the allocation component 725 may identify a first previously allocated channel state information processing unit associated with an uplink grant and a second previously allocated channel state information processing unit associated with a prior downlink grant. In some examples, the priority component 740 may determine that the prior downlink grant has a lower priority than the uplink grant. In some examples, the release component 745 may release the second previously allocated channel state information processing unit based on the determined priority, where the additional channel state information processing unit includes the released channel state information processing unit.

In some examples, the allocation component 725 may determine that a set of previously allocated channel state information processing units is associated with a second downlink grant. In some examples, the release component 745 may release all the set of previously allocated channel state information processing units based on determining that the set of previously allocated channel state information processing units is associated with the second downlink grant, where the additional channel state information processing unit includes the released set of channel state information processing units.

In some examples, the release component 745 may refrain from releasing the set of previously allocated channel state information processing units based on determining that the set of previously allocated channel state information processing units is associated with the second downlink grant, where allocating the set of channel state information processing units is based on refraining from releasing the set of previously allocated channel state information processing units.

In some examples, the allocation component 725 may identify a first set of previously allocated channel state information processing units associated with a second downlink grant and a second set of previously allocated channel state information processing units associated with a third downlink grant. In some examples, the priority component 740 may determine that the second downlink grant has a higher priority than the third downlink grant.

In some cases, a priority associated with the second downlink grant is based on a type of indication associated with the second downlink grant and a priority associated with the third downlink grant is based on the type of indication associated with the third downlink grant, and where allocating the set of channel state information processing units for transmitting the channel state information report is based on the priority associated with the second downlink grant and the priority associated with the third downlink grant. In some cases, the type of indication includes a type 1 indication or a type 2 indication. In some cases, the type 2 indication has a higher priority than the type 1 indication.

In some examples, the release component 745 may release the first set of previously allocated channel state information processing units based on determining that the second downlink grant has the higher priority than the third downlink grant, where the additional channel state information processing unit includes the released set of channel state information processing units.

Figure 8:
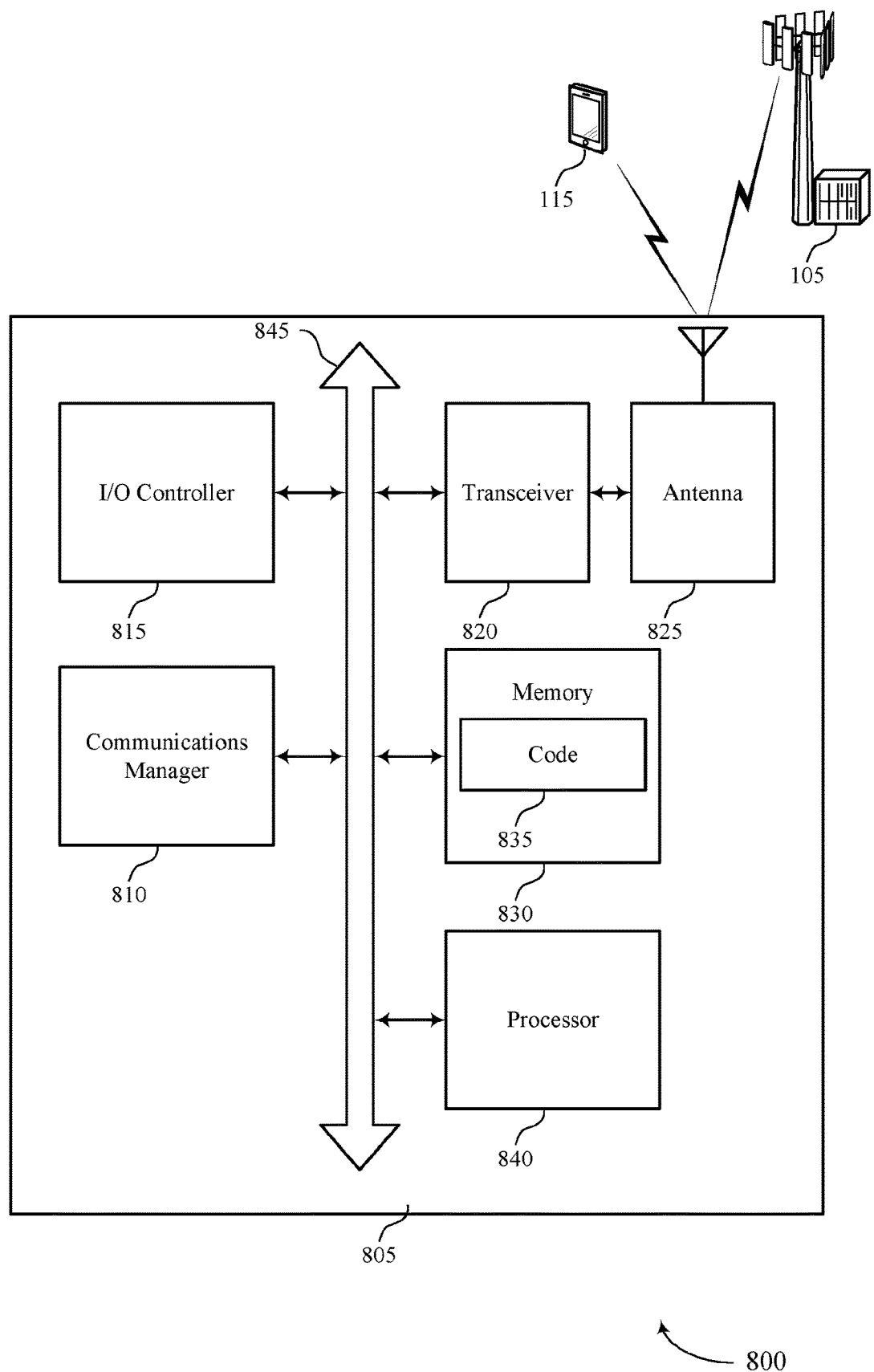
FIG. 8 shows a diagram of a system including a device that supports channel state information processing unit assignment for channel state information reporting in accordance with aspects of the present disclosure.

FIG. 8 shows a diagram of a system 800 including a device 805 that supports channel state information processing unit assignment for channel state information reporting in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a downlink grant including an indication to report channel state information. The communications manager 810 may identify, based on the downlink grant, a number of channel state information processing units associated with reporting the channel state information. The communications manager 810 may determine that an available number of channel state information processing units is less than the number of channel state information processing units. The communications manager 810 may allocate, based on the determining, a set of channel state information processing units for transmitting a channel state information report, the set of channel state information processing units including the available number of channel state information processing units and one or more additional channel state information processing units. The communications manager 810 may transmit the channel state information report based on the set of channel state information processing units.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state information processing unit assignment for channel state information reporting).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
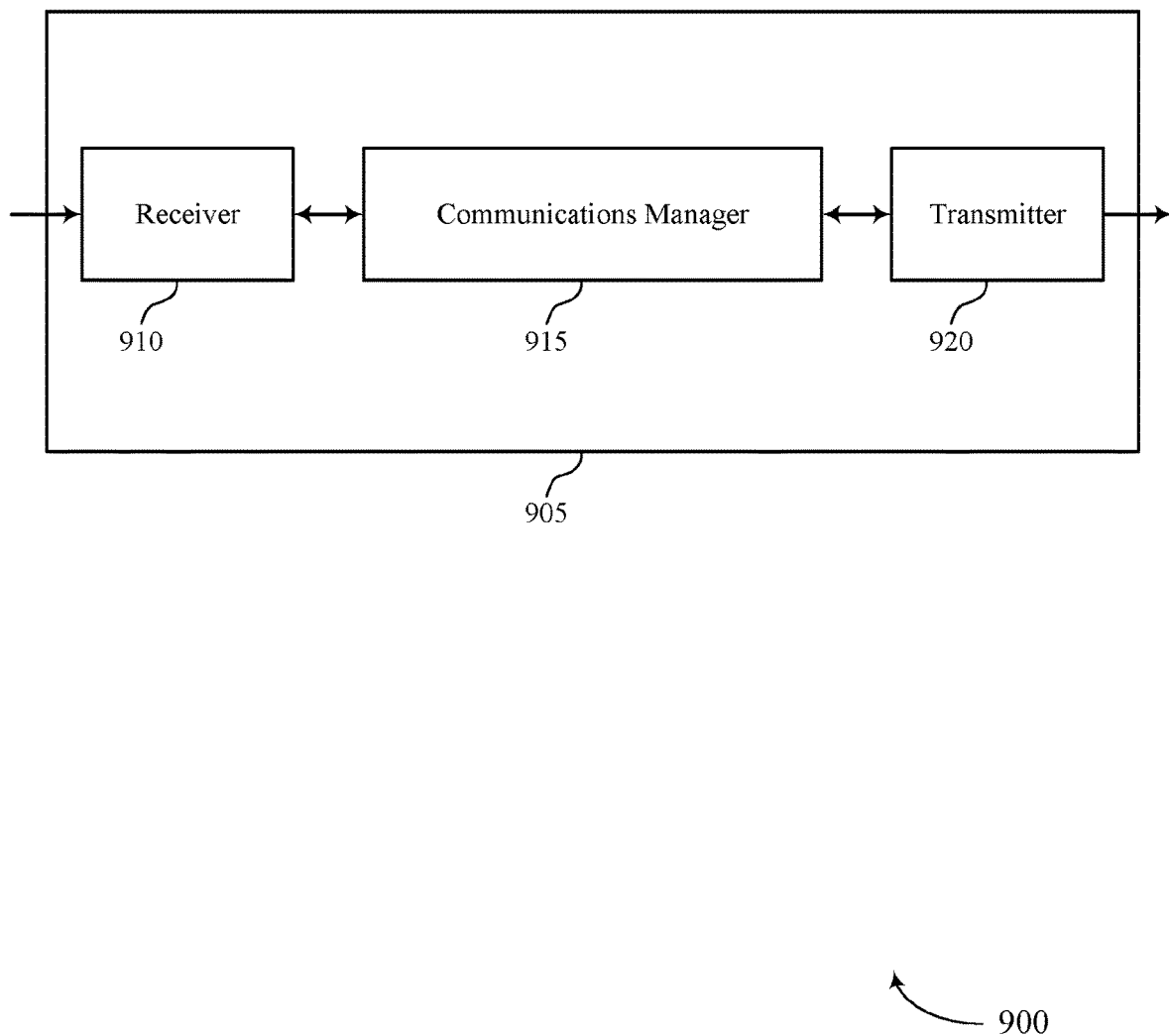
FIGS. 9 and 10 show block diagrams of devices that support channel state information processing unit assignment for channel state information reporting in accordance with aspects of the present disclosure.

FIG. 9 shows a block diagram 900 of a device 905 that supports channel state information processing unit assignment for channel state information reporting in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to channel state information processing unit assignment for channel state information reporting, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a configuration for a UE to allocate a set of channel state information processing units based on an available number of channel state information processing units and a number of channel state information processing units associated with reporting channel state information, transmit the configuration for the UE to allocate the set of channel state information processing units, transmit a downlink grant including an indication for the UE to report the channel state information based on the configuration, and receive, in response to the downlink grant, a channel state information report based on the set of channel state information processing units. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
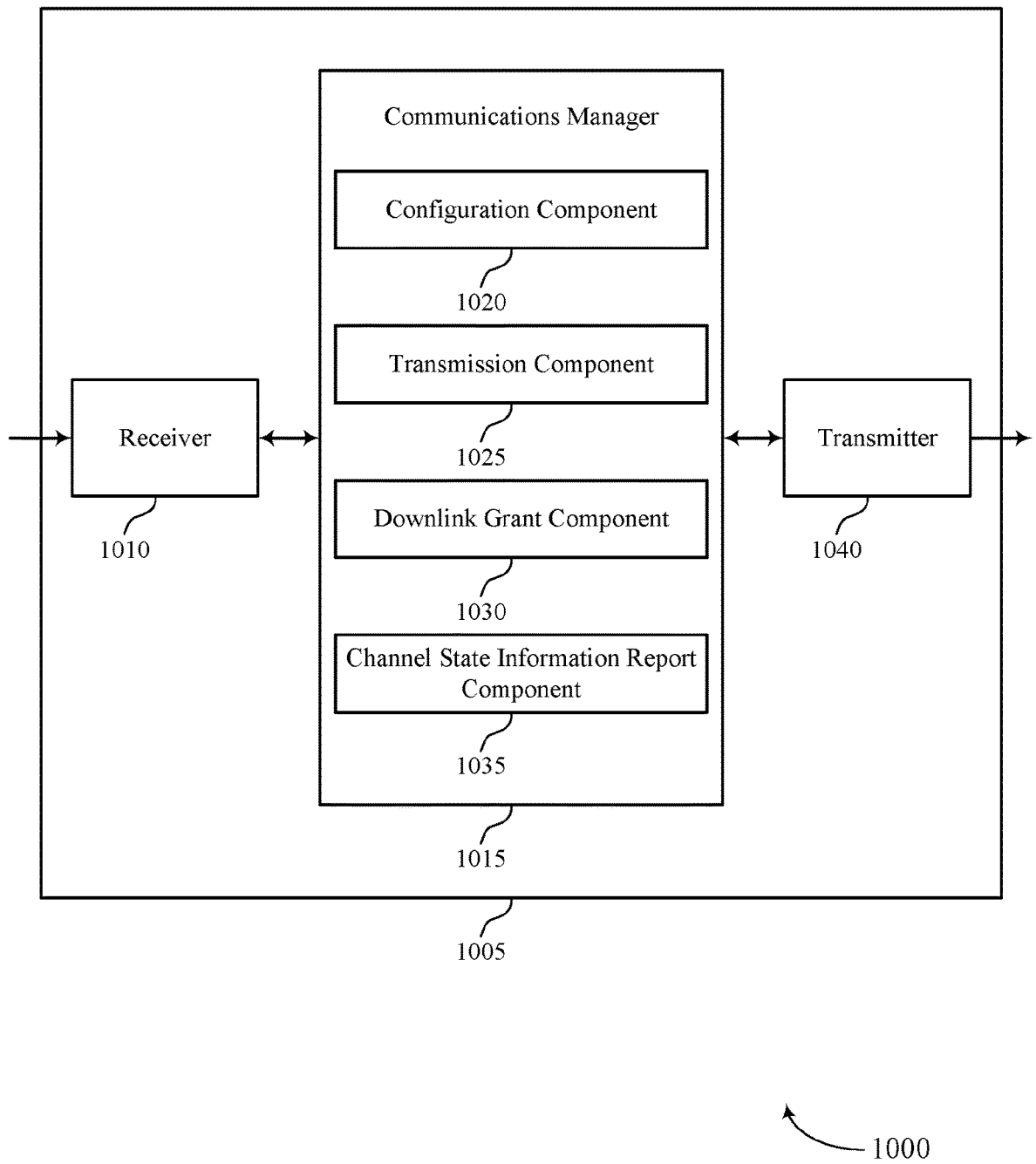

FIG. 10 shows a block diagram 1000 of a device 1005 that supports channel state information processing unit assignment for channel state information reporting in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to channel state information processing unit assignment for channel state information reporting, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration component 1020, a transmission component 1025, a downlink grant component 1030, and a channel state information report component 1035. The communications manager 1015 may be an example of aspects of the communications manager 1210 described herein.

The configuration component 1020 may determine a configuration for a UE to allocate a set of channel state information processing units based on an available number of channel state information processing units and a number of channel state information processing units associated with reporting channel state information. The transmission component 1025 may transmit the configuration for the UE to allocate the set of channel state information processing units. The downlink grant component 1030 may transmit a downlink grant including an indication for the UE to report the channel state information based on the configuration. The channel state information report component 1035 may receive, in response to the downlink grant, a channel state information report based on the set of channel state information processing units.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
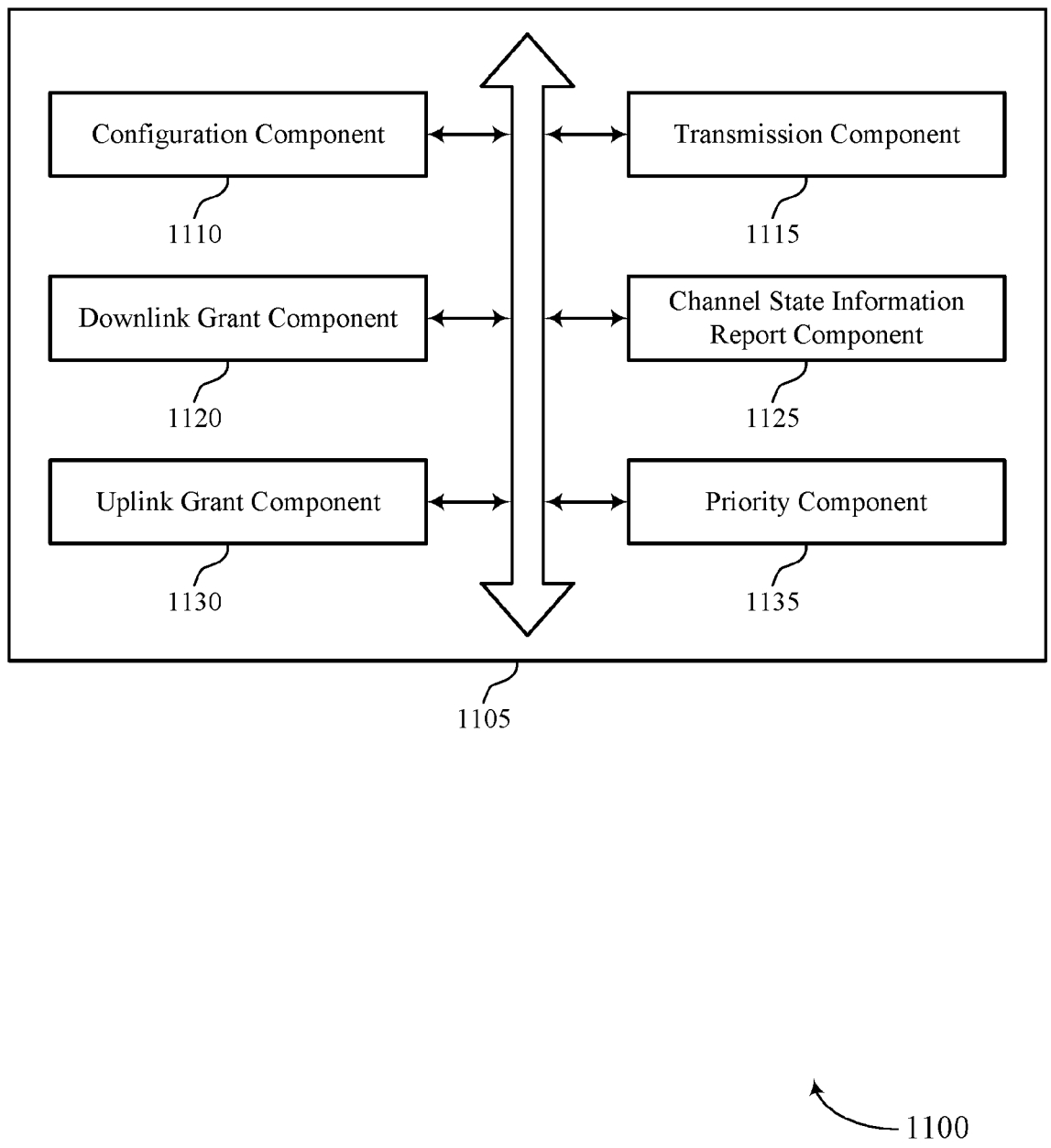
FIG. 11 shows a block diagram of a communications manager that supports channel state information processing unit assignment for channel state information reporting in accordance with aspects of the present disclosure.

FIG. 11 shows a block diagram 1100 of a communications manager 1105 that supports channel state information processing unit assignment for channel state information reporting in accordance with aspects of the present disclosure. The communications manager 1105 may be an example of aspects of a communications manager 915, a communications manager 1015, or a communications manager 1210 described herein. The communications manager 1105 may include a configuration component 1110, a transmission component 1115, a downlink grant component 1120, a channel state information report component 1125, an uplink grant component 1130, and a priority component 1135. Each of these modules may communicate, directly or indirectly, with one another (e.g., via one or more buses).

The configuration component 1110 may determine a configuration for a UE to allocate a set of channel state information processing units based on an available number of channel state information processing units and a number of channel state information processing units associated with reporting channel state information.

The transmission component 1115 may transmit the configuration for the UE to allocate the set of channel state information processing units. The downlink grant component 1120 may transmit a downlink grant including an indication for the UE to report the channel state information based on the configuration.

In some examples, the downlink grant component 1120 may transmit the downlink grant via a physical downlink control channel. In some examples, the downlink grant component 1120 may transmit the downlink grant via downlink control information. In some cases, the downlink grant is associated with an ultra reliable low latency communication.

The channel state information report component 1125 may receive, in response to the downlink grant, a channel state information report based on the set of channel state information processing units. In some examples, the channel state information report component 1125 may receive the channel state information report via a physical uplink shared channel or a physical uplink control channel.

The uplink grant component 1130 may transmit an uplink grant including a second indication for the UE to report second channel state information, where the configuration includes a second configuration for the UE to identify the available number of channel state information processing units before allocating a number of channel state information processing units for reporting the second channel state information.

In some examples, uplink grant component 1130 may transmit an uplink grant including a second indication to report second channel state information, where the configuration includes a second configuration for the UE to identify the available number of channel state information processing units after allocating a number of channel state information processing units for reporting the second channel state information. In some examples, uplink grant component 1130 may transmit an uplink grant including a second indication to report second channel state information, where the configuration includes a second configuration for the UE to identify the available number of channel state information processing units, based on determining that the downlink grant is associated with a higher priority than the uplink grant, before allocating a number of channel state information processing units for reporting the second channel state information.

In some examples, uplink grant component 1130 may transmit an uplink grant including a second indication to report second channel state information, where the configuration includes a second configuration for the UE to identify the available number of channel state information processing units, based on determining that the uplink grant is associated with a higher priority than the downlink grant, after allocating a number of channel state information processing units for reporting the second channel state information. In some examples, the configuration may include a third configuration for the UE to release a previously allocated channel state information processing unit based on determining that the uplink grant is associated with the higher priority than the downlink grant.

In some examples, uplink grant component 1130 may transmit an uplink grant including a second indication to report second channel state information, where the configuration includes a second configuration for the UE to identify the available number of channel state information processing units, based on determining that the uplink grant is associated with the same priority as the downlink grant, before allocating a number of channel state information processing units for reporting the second channel state information.

In some examples, uplink grant component 1130 may transmit an uplink grant including a second indication to report second channel state information, where the configuration includes a second configuration for the UE to identify the available number of channel state information processing units, based on determining that the uplink grant is associated with the same priority as the downlink grant, after allocating a number of channel state information processing units for reporting the second channel state information. In some examples, uplink grant component 1130 may transmit an uplink grant concurrently with the downlink grant, the uplink grant including a second indication to report second channel state information, where the configuration includes a second configuration for the UE to identify the available number of channel state information processing units based on that the uplink grant being transmitted concurrently with the downlink grant. In some cases, the configuration includes a second configuration for the UE to allocate the set of channel state information processing units based on determining that the additional channel state information processing unit is associated with a prior downlink grant.

In some cases, the configuration includes a second configuration for the UE to release the previously allocated channel state information processing unit based on a priority associated with a previously allocated channel state information processing unit, and where the additional channel state information processing unit includes the released channel state information processing unit. In some cases, the additional channel state information processing unit is associated with a prior downlink grant. In some cases, the prior downlink grant has a lower priority than the downlink grant.

In some cases, the configuration includes a second configuration for the UE to release a previously allocated channel state information processing unit associated with a first uplink grant based on determining that the first uplink grant is received at the UE before a second uplink grant, and where the additional channel state information processing unit includes the released channel state information processing unit.

In some cases, the configuration includes a second configuration for the UE to release a previously allocated channel state information processing unit associated with an uplink grant based on a type of reporting associated with the previously allocated channel state information processing unit, and where the additional channel state information processing unit includes the released channel state information processing unit. In some cases, the type of reporting includes periodic channel state information reporting, semi-persistent channel state information reporting, aperiodic channel state information reporting, or any combination thereof.

In some cases, the configuration includes a second configuration for the UE to release a previously allocated channel state information processing unit associated with an uplink grant based on one or more reporting parameters associated with the previously allocated channel state information processing unit, and where the additional channel state information processing unit includes the released channel state information processing unit. In some cases, the one or more reporting parameters include a channel quality indicator, a pre-coding matrix indicator, a rank indicator, or any combination thereof.

In some cases, the configuration includes a second configuration for the UE to release a previously allocated channel state information processing unit based on determining that the previously allocated channel state information processing unit is associated with an uplink grant, and where the additional channel state information processing unit includes the released channel state information processing unit.

In some cases, the configuration includes a second configuration for the UE to release a previously allocated channel state information processing unit associated with an uplink grant based on a priority associated with the uplink grant, and where the additional channel state information processing unit includes the released channel state information processing unit.

In some cases, the configuration includes a second configuration for the UE a set of previously allocated channel state information processing units based on determining that the set of previously allocated channel state information processing units is associated with a second downlink grant, and where the additional channel state information processing unit includes the released set of channel state information processing units.

In some cases, the configuration includes a second configuration for the UE to refrain from releasing a set of previously allocated channel state information processing units based on determining that the set of previously allocated channel state information processing units is associated with a second downlink grant, and where allocating the set of channel state information processing units is based on refraining from releasing the set of previously allocated channel state information processing units.

In some examples, the configuration component 1110 may configure a UE to identify a first previously allocated channel state information processing unit associated with an uplink grant and a second previously allocated channel state information processing unit associated with a prior downlink grant. In some examples, the configuration component 1110 may configure a UE to determine that the prior downlink grant has a lower priority than the uplink grant. In some examples, the configuration component 1110 may configure a UE to release the second previously allocated channel state information processing unit based on the determined priority, where the additional channel state information processing unit includes the released channel state information processing unit.

In some examples, the configuration component 1110 may configure a UE to identify a first set of previously allocated channel state information processing units associated with a second downlink grant and a second set of previously allocated channel state information processing units associated with a third downlink grant. In some examples, the configuration component 1110 may configure a UE to determine that the second downlink grant has a higher priority than the third downlink grant. In some examples, the configuration component 1110 may configure a UE to release the first set of previously allocated channel state information processing units based on determining that the second downlink grant has the higher priority than the third downlink grant, where the additional channel state information processing unit includes the released set of channel state information processing units.

The priority component 1135 may identify a priority associated with downlink grants. In some cases, a priority associated with the second downlink grant is based on a type of indication associated with the second downlink grant and a priority associated with the third downlink grant is based on the type of indication associated with the third downlink grant, and where allocating the set of channel state information processing units is based on the priority associated with the second downlink grant and the priority associated with the third downlink grant. In some cases, the type of indication includes a type 1 indication or a type 2 indication. In some cases, the type 2 indication has a higher priority than the type 1 indication.

Figure 12:
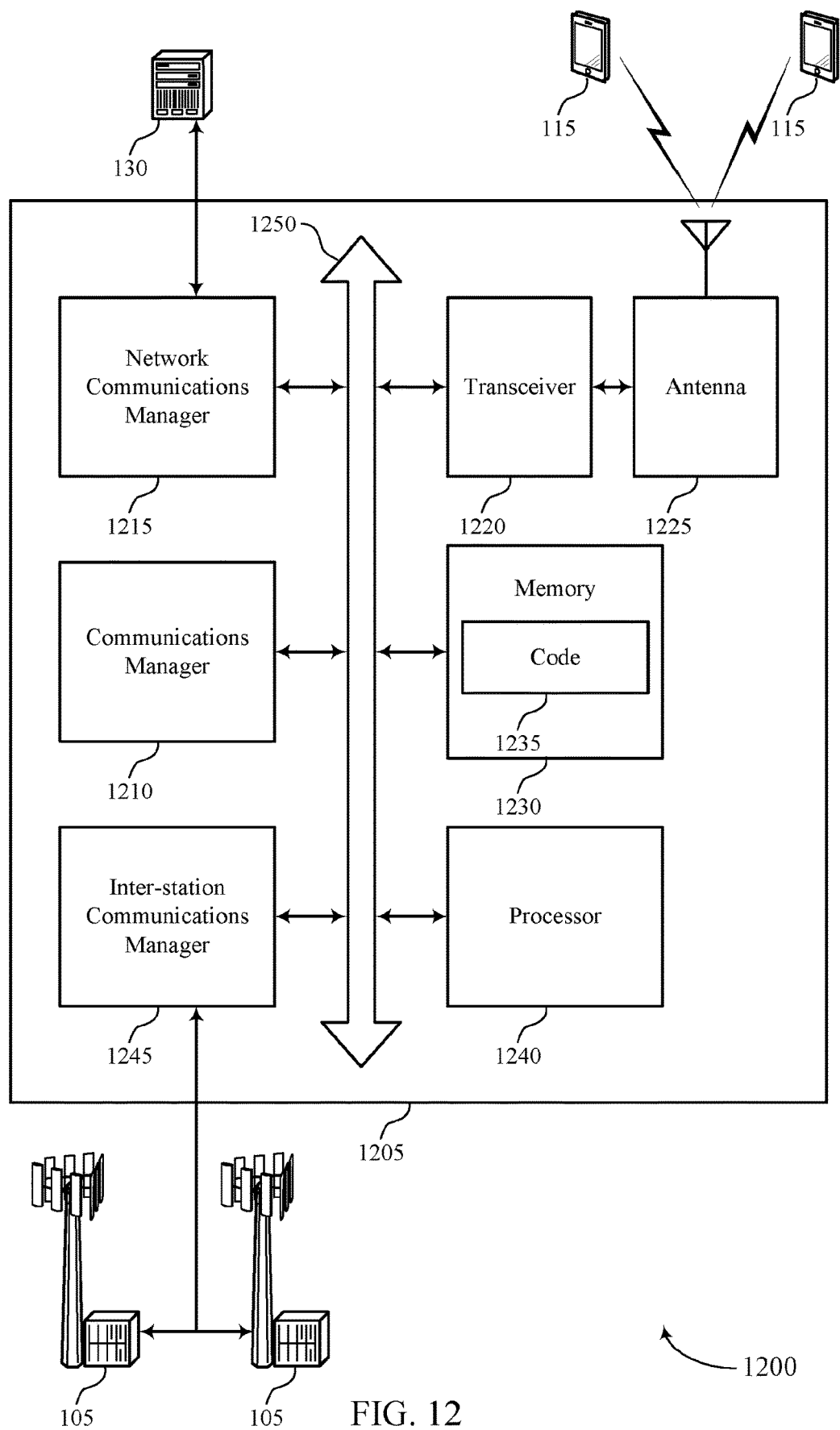
FIG. 12 shows a diagram of a system including a device that supports channel state information processing unit assignment for channel state information reporting in accordance with aspects of the present disclosure.

FIG. 12 shows a diagram of a system 1200 including a device 1205 that supports channel state information processing unit assignment for channel state information reporting in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a configuration for a UE to allocate a set of channel state information processing units based on an available number of channel state information processing units and a number of channel state information processing units associated with reporting channel state information. The communications manager 1210 may transmit the configuration for the UE to allocate the set of channel state information processing units. The communications manager 1210 may transmit a downlink grant including an indication for the UE to report the channel state information based on the configuration. The communications manager 1210 may receive, in response to the downlink grant, a channel state information report based on the set of channel state information processing units.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel state information processing unit assignment for channel state information reporting).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
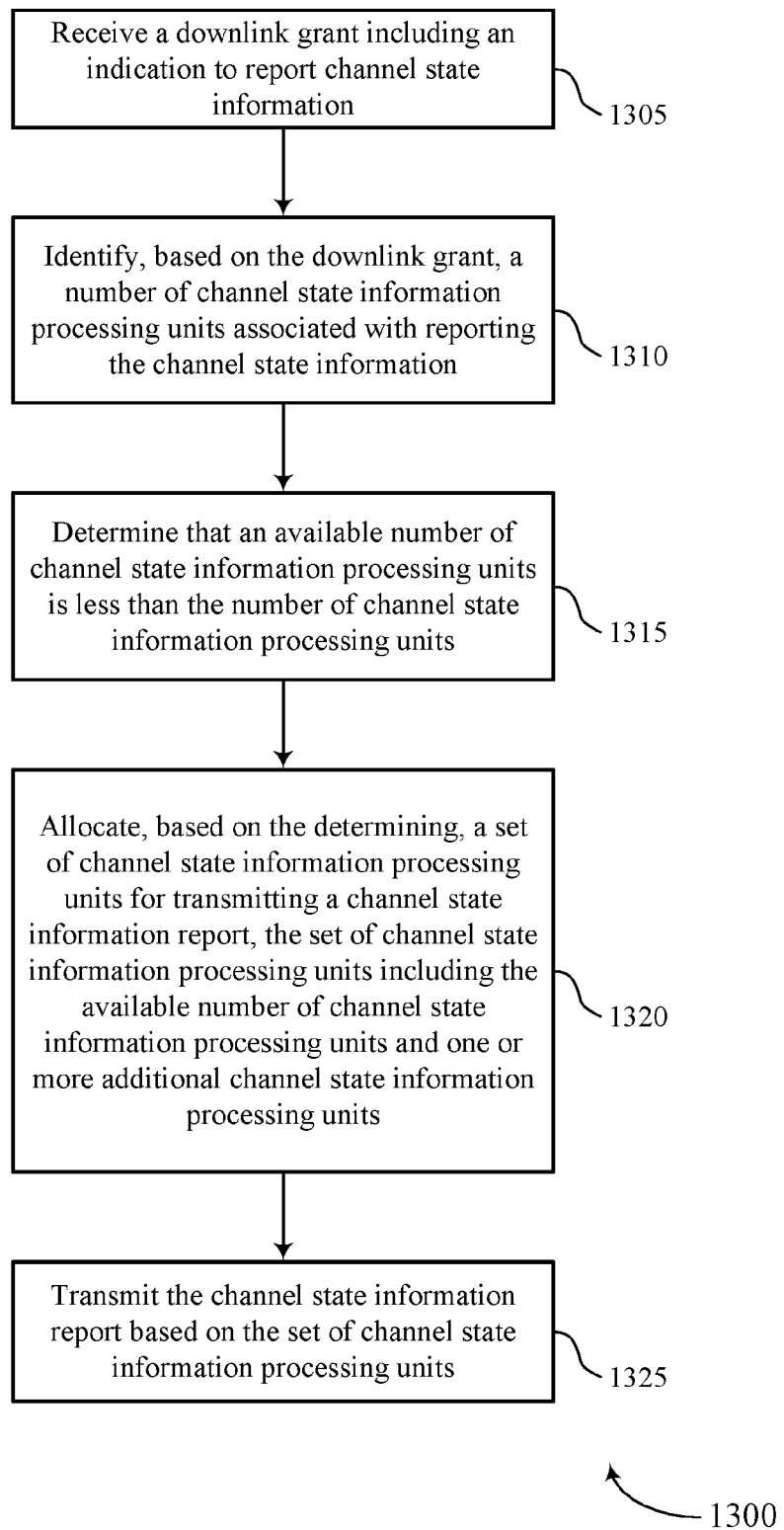
FIGS. 13 through 16 show flowcharts illustrating methods that support channel state information processing unit assignment for channel state information reporting in accordance with aspects of the present disclosure.

FIG. 13 shows a flowchart illustrating a method 1300 that supports channel state information processing unit assignment for channel state information reporting in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a downlink grant including an indication to report channel state information. The operations of 1305 may be performed according to the methods described herein. In some examples, aspects of the operations of 1305 may be performed by a downlink grant component as described with reference to FIGS. 5 through 8.

At 1310, the UE may identify, based on the downlink grant, a number of channel state information processing units associated with reporting the channel state information. The operations of 1310 may be performed according to the methods described herein. In some examples, aspects of the operations of 1310 may be performed by a processing unit identification component as described with reference to FIGS. 5 through 8.

At 1315, the UE may determine that an available number of channel state information processing units is less than the number of channel state information processing units. The operations of 1315 may be performed according to the methods described herein. In some examples, aspects of the operations of 1315 may be performed by an available processing unit determination component as described with reference to FIGS. 5 through 8.

At 1320, the UE may allocate, based on the determining, a set of channel state information processing units for transmitting a channel state information report, the set of channel state information processing units including the available number of channel state information processing units and one or more additional channel state information processing units. The operations of 1320 may be performed according to the methods described herein. In some examples, aspects of the operations of 1320 may be performed by an allocation component as described with reference to FIGS. 5 through 8.

At 1325, the UE may transmit the channel state information report based on the set of channel state information processing units. The operations of 1325 may be performed according to the methods described herein. In some examples, aspects of the operations of 1325 may be performed by a transmission component as described with reference to FIGS. 5 through 8.

Figure 14:
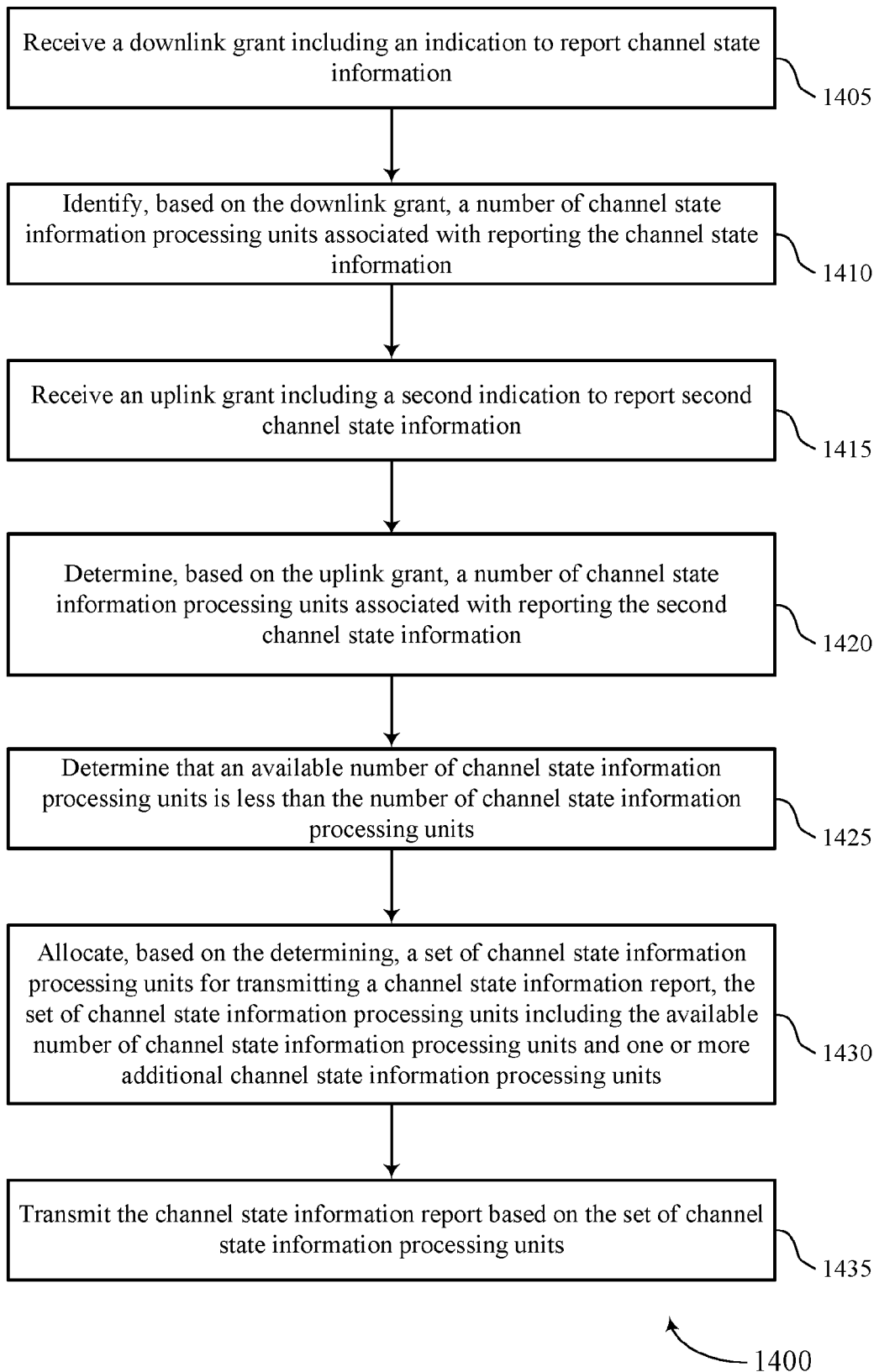

FIG. 14 shows a flowchart illustrating a method 1400 that supports channel state information processing unit assignment for channel state information reporting in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a downlink grant including an indication to report channel state information. The operations of 1405 may be performed according to the methods described herein. In some examples, aspects of the operations of 1405 may be performed by a downlink grant component as described with reference to FIGS. 5 through 8.

At 1410, the UE may identify, based on the downlink grant, a number of channel state information processing units associated with reporting the channel state information. The operations of 1410 may be performed according to the methods described herein. In some examples, aspects of the operations of 1410 may be performed by a processing unit identification component as described with reference to FIGS. 5 through 8.

At 1415, the UE may receive an uplink grant including a second indication to report second channel state information. The operations of 1415 may be performed according to the methods described herein. In some examples, aspects of the operations of 1415 may be performed by an uplink grant component as described with reference to FIGS. 5 through 8.

At 1420, the UE may determine, based on the uplink grant, a number of channel state information processing units associated with reporting the second channel state information. The operations of 1420 may be performed according to the methods described herein. In some examples, aspects of the operations of 1420 may be performed by an available processing unit determination component as described with reference to FIGS. 5 through 8.

At 1425, the UE may determine that an available number of channel state information processing units is less than the number of channel state information processing units. The operations of 1425 may be performed according to the methods described herein. In some examples, aspects of the operations of 1425 may be performed by an available processing unit determination component as described with reference to FIGS. 5 through 8.

At 1430, the UE may allocate, based on the determining, a set of channel state information processing units for transmitting a channel state information report, the set of channel state information processing units including the available number of channel state information processing units and one or more additional channel state information processing units. In some cases, the available number of channel state information processing units are identified before allocating the number of channel state information processing units for reporting the second channel state information. The operations of 1430 may be performed according to the methods described herein. In some examples, aspects of the operations of 1430 may be performed by an allocation component as described with reference to FIGS. 5 through 8.

At 1435, the UE may transmit the channel state information report based on the set of channel state information processing units. The operations of 1435 may be performed according to the methods described herein. In some examples, aspects of the operations of 1435 may be performed by a transmission component as described with reference to FIGS. 5 through 8.

Figure 15:
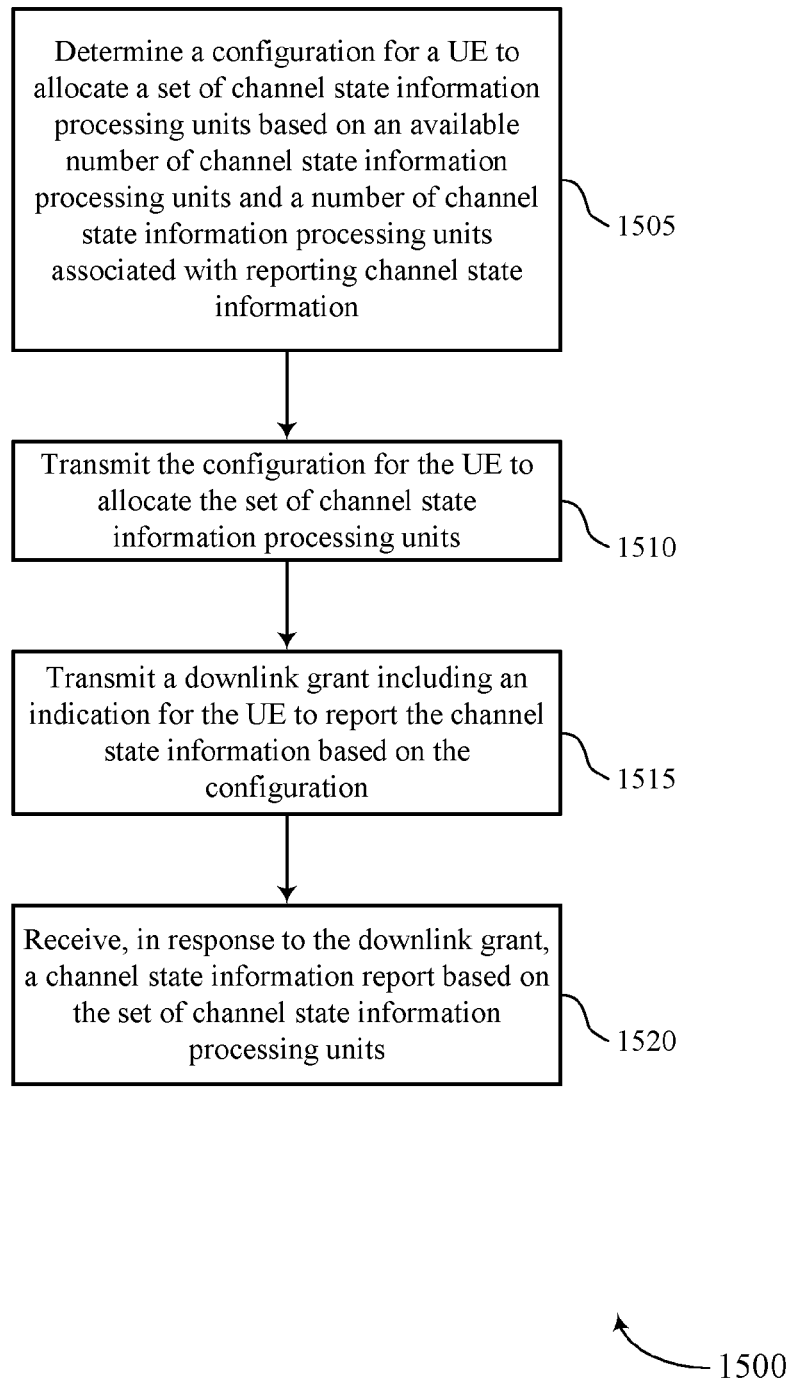

FIG. 15 shows a flowchart illustrating a method 1500 that supports channel state information processing unit assignment for channel state information reporting in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below.

Additionally or alternatively, a base station may perform aspects of the functions described below using special-purpose hardware.

At 1505, the base station may determine a configuration for a UE to allocate a set of channel state information processing units based on an available number of channel state information processing units and a number of channel state information processing units associated with reporting channel state information. The operations of 1505 may be performed according to the methods described herein. In some examples, aspects of the operations of 1505 may be performed by a configuration component as described with reference to FIGS. 9 through 12.

At 1510, the base station may transmit the configuration for the UE to allocate the set of channel state information processing units. The operations of 1510 may be performed according to the methods described herein. In some examples, aspects of the operations of 1510 may be performed by a transmission component as described with reference to FIGS. 9 through 12.

At 1515, the base station may transmit a downlink grant including an indication for the UE to report the channel state information based on the configuration. The operations of 1515 may be performed according to the methods described herein. In some examples, aspects of the operations of 1515 may be performed by a downlink grant component as described with reference to FIGS. 9 through 12.

At 1520, the base station may receive, in response to the downlink grant, a channel state information report based on the set of channel state information processing units. The operations of 1520 may be performed according to the methods described herein. In some examples, aspects of the operations of 1520 may be performed by a channel state information report component as described with reference to FIGS. 9 through 12.

Figure 16:
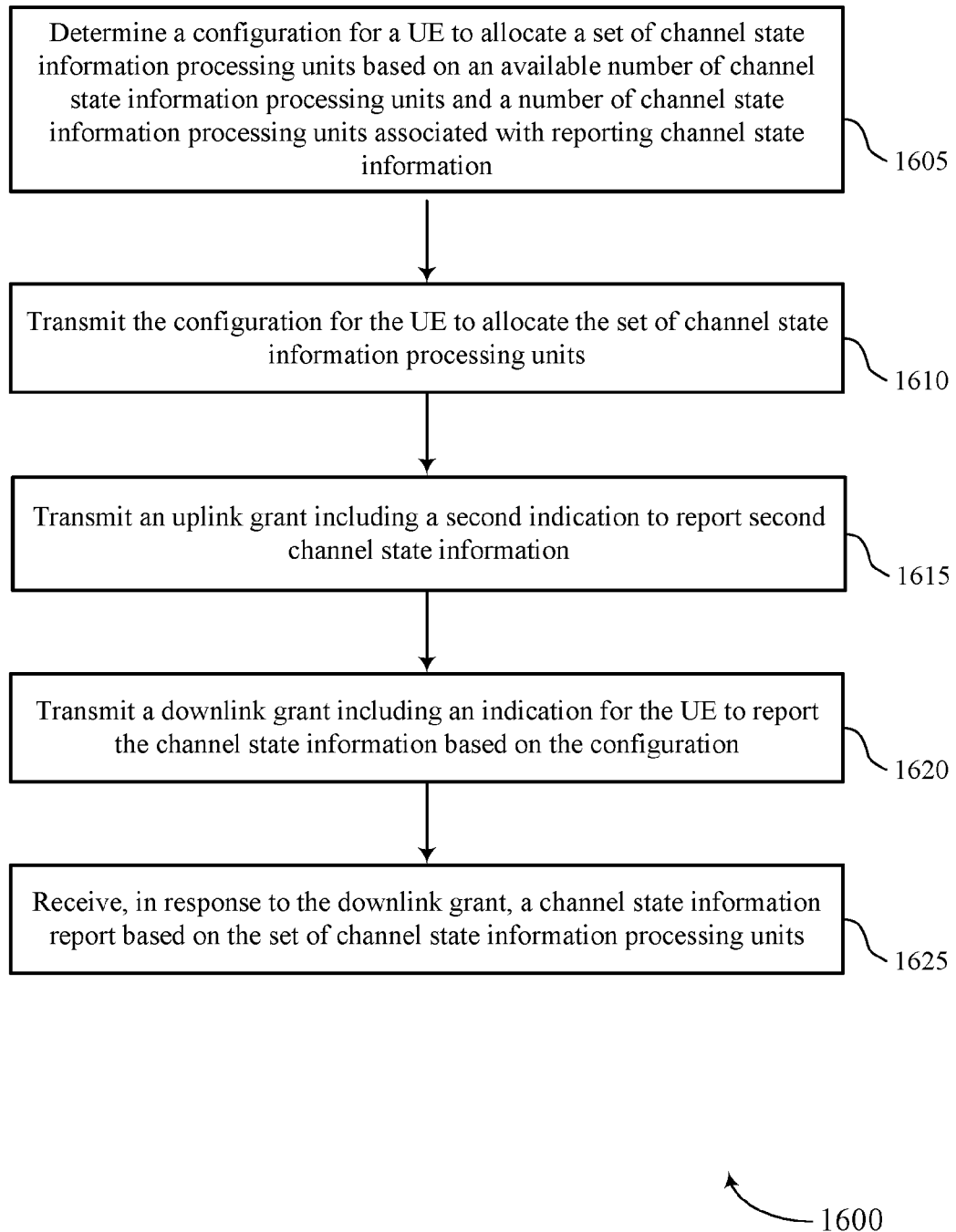

FIG. 16 shows a flowchart illustrating a method 1600 that supports channel state information processing unit assignment for channel state information reporting in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may determine a configuration for a UE to allocate a set of channel state information processing units based on an available number of channel state information processing units and a number of channel state information processing units associated with reporting channel state information. The operations of 1605 may be performed according to the methods described herein. In some examples, aspects of the operations of 1605 may be performed by a configuration component as described with reference to FIGS. 9 through 12.

At 1610, the base station may transmit the configuration for the UE to allocate the set of channel state information processing units. The operations of 1610 may be performed according to the methods described herein. In some examples, aspects of the operations of 1610 may be performed by a transmission component as described with reference to FIGS. 9 through 12.

At 1615, the base station may transmit an uplink grant including a second indication to report second channel state information. In some cases, the configuration may include a second configuration for the UE to identify the available number of channel state information processing units after allocating a number of channel state information processing units for reporting the second channel state information. The operations of 1615 may be performed according to the methods described herein. In some examples, aspects of the operations of 1615 may be performed by an uplink grant component as described with reference to FIGS. 9 through 12.

At 1620, the base station may transmit a downlink grant including an indication for the UE to report the channel state information based on the configuration. The operations of 1620 may be performed according to the methods described herein. In some examples, aspects of the operations of 1620 may be performed by a downlink grant component as described with reference to FIGS. 9 through 12.

At 1625, the base station may receive, in response to the downlink grant, a channel state information report based on the set of channel state information processing units. The operations of 1625 may be performed according to the methods described herein. In some examples, aspects of the operations of 1625 may be performed by a channel state information report component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a downlink grant including an indication to report channel state information;
identifying, based at least in part on the downlink grant, a quantity of channel state information processing units associated with reporting the channel state information;
determining that an available quantity of channel state information processing units is less than the quantity of channel state information processing units;
allocating, based at least in part on the determining, a set of channel state information processing units for transmitting a channel state information report, the set of channel state information processing units comprising the available quantity of channel state information processing units and one or more additional channel state information processing units; and
transmitting the channel state information report based at least in part on the set of channel state information processing units.

2. The method of claim 1, further comprising:
receiving an uplink grant including a second indication to report second channel state information; and
determining, based at least in part on the uplink grant, a quantity of channel state information processing units associated with reporting the second channel state information, wherein the available quantity of channel state information processing units are identified before allocating the quantity of channel state information processing units for reporting the second channel state information.

3. The method of claim 1, further comprising:
receiving an uplink grant including a second indication to report second channel state information; and
determining, based at least in part on the uplink grant, a quantity of channel state information processing units associated with reporting the second channel state information, wherein the available quantity of channel state information processing units are identified after allocating the quantity of channel state information processing units for reporting the second channel state information.

4. The method of claim 1, further comprising:
receiving an uplink grant including a second indication to report second channel state information;
determining, based at least in part on the uplink grant, a quantity of channel state information processing units associated with reporting the second channel state information; and
determining that the downlink grant is associated with a higher priority than the uplink grant, wherein the available quantity of channel state information processing units are identified, based at least in part on determining that the downlink grant is associated with the higher priority than the uplink grant, before allocating the quantity of channel state information processing units for reporting the second channel state information.

5. The method of claim 1, further comprising:
receiving an uplink grant including a second indication to report second channel state information;
determining, based at least in part on the uplink grant, a quantity of channel state information processing units associated with reporting the second channel state information; and
determining that the uplink grant is associated with a higher priority than the downlink grant, wherein the available quantity of channel state information processing units are identified, based at least in part on determining that the uplink grant is associated with the higher priority than the downlink grant, after allocating the quantity of channel state information processing units for reporting the second channel state information.

6. The method of claim 5, further comprising:
releasing a previously allocated channel state information processing unit based at least in part on determining that the uplink grant is associated with the higher priority than the downlink grant, wherein allocating the set of channel state information processing units is based at least in part on releasing the previously allocated channel state information processing unit.

7. The method of claim 1, further comprising:
receiving an uplink grant including a second indication to report second channel state information;
determining, based at least in part on the uplink grant, a quantity of channel state information processing units associated with reporting the second channel state information; and
determining that the uplink grant is associated with a same priority as the downlink grant, wherein the available quantity of channel state information processing units are identified, based at least in part on determining that the uplink grant is associated with a same priority as the downlink grant, before allocating the quantity of channel state information processing units for reporting the second channel state information.

8. The method of claim 1, further comprising:
receiving an uplink grant including a second indication to report second channel state information;
determining, based at least in part on the uplink grant, a quantity of channel state information processing units associated with reporting the second channel state information; and
determining that the uplink grant is associated with a same priority as the downlink grant, wherein the available quantity of channel state information processing units are identified, based at least in part on determining that the uplink grant is associated with a same priority as the downlink grant, after allocating the quantity of channel state information processing units for reporting the second channel state information.

9. The method of claim 1, further comprising:
receiving an uplink grant including a second indication to report second channel state information; and
determining that the uplink grant is received concurrently with the downlink grant, wherein identifying the available quantity of channel state information processing units is based at least in part on determining that the uplink grant is received concurrently with the downlink grant.

10. The method of claim 9, wherein the determining further comprises:
determining that the uplink grant is received concurrently with the downlink grant based at least in part on a last symbol of a physical downlink control channel associated with the downlink grant being a same as a last symbol of a physical downlink control channel associated with the uplink grant.

11. The method of claim 1, further comprising:
determining whether the additional channel state information processing unit is associated with a prior downlink grant, wherein allocating the set of channel state information processing units is based at least in part on determining that the additional channel state information processing unit is associated with the prior downlink grant.

12. The method of claim 1, wherein allocating the set of channel state information processing units further comprises:
determining a priority associated with a previously allocated channel state information processing unit; and
releasing the previously allocated channel state information processing unit based at least in part on the determined priority, wherein the additional channel state information processing unit comprises the released channel state information processing unit.

13. The method of claim 12, wherein the additional channel state information processing unit is associated with a prior downlink grant.

14. The method of claim 13, wherein the prior downlink grant has a lower priority than the downlink grant.

15. The method of claim 1, wherein allocating the set of channel state information processing units further comprises:
identifying a first previously allocated channel state information processing unit associated with a first uplink grant and a second previously allocated channel state information processing unit associated with a second uplink grant;
determining that the first uplink grant is received before the second uplink grant; and
releasing the first previously allocated channel state information processing unit based at least in part on determining that the first uplink grant is received before the second uplink grant, wherein the additional channel state information processing unit comprises the released channel state information processing unit.

16. The method of claim 1, wherein allocating the set of channel state information processing units further comprises:
identifying a previously allocated channel state information processing unit associated with an uplink grant;
determining a type of reporting associated with the previously allocated channel state information processing unit; and
releasing the previously allocated channel state information processing unit based at least in part on the type of reporting, wherein the additional channel state information processing unit comprises the released channel state information processing unit.

17. The method of claim 16, wherein the type of reporting comprises periodic channel state information reporting, semi-persistent channel state information reporting, aperiodic channel state information reporting, or any combination thereof.

18. The method of claim 1, wherein allocating the set of channel state information processing units further comprises:
identifying a previously allocated channel state information processing unit associated with an uplink grant;
determining one or more reporting parameters associated with the previously allocated channel state information processing unit; and
releasing the previously allocated channel state information processing unit based at least in part on the one or more reporting parameters, wherein the additional channel state information processing unit comprises the released channel state information processing unit.

19. The method of claim 18, wherein the one or more reporting parameters comprise a channel quality indicator, a pre-coding matrix indicator, a rank indicator, or any combination thereof.

20. The method of claim 1, wherein allocating the set of channel state information processing units further comprises:
determining that a previously allocated channel state information processing unit is associated with an uplink grant; and
releasing the previously allocated channel state information processing unit based at least in part on determining that the previously allocated channel state information processing unit is associated with the uplink grant, wherein the additional channel state information processing unit comprises the released channel state information processing unit.

21. The method of claim 1, wherein allocating the set of channel state information processing units further comprises:
identifying a previously allocated channel state information processing unit associated with an uplink grant;
determining a priority associated with the uplink grant; and
releasing the previously allocated channel state information processing unit based at least in part on the determined priority, wherein the additional channel state information processing unit comprises the released channel state information processing unit.

22. The method of claim 1, wherein allocating the set of channel state information processing units further comprises:
identifying a first previously allocated channel state information processing unit associated with an uplink grant and a second previously allocated channel state information processing unit associated with a prior downlink grant;
determining that the prior downlink grant has a lower priority than the uplink grant; and
releasing the second previously allocated channel state information processing unit based at least in part on the determined priority, wherein the additional channel state information processing unit comprises the released channel state information processing unit.

23. The method of claim 1, wherein allocating the set of channel state information processing units further comprises:
determining that a plurality of previously allocated channel state information processing units is associated with a second downlink grant; and
releasing all the plurality of previously allocated channel state information processing units based at least in part on determining that the plurality of previously allocated channel state information processing units is associated with the second downlink grant, wherein the additional channel state information processing unit comprises the released plurality of channel state information processing units.

24. The method of claim 1, further comprising:
  determining that a plurality of previously allocated channel state information processing units is associated with a second downlink grant; and
  refraining from releasing the plurality of previously allocated channel state information processing units based at least in part on determining that the plurality of previously allocated channel state information processing units is associated with the second downlink grant, wherein allocating the set of channel state information processing units is based at least in part on refraining from releasing the plurality of previously allocated channel state information processing units.

25. The method of claim 1, wherein allocating the set of channel state information processing units further comprises:
  identifying a first plurality of previously allocated channel state information processing units associated with a second downlink grant and a second plurality of previously allocated channel state information processing units associated with a third downlink grant;
  determining that the second downlink grant has a higher priority than the third downlink grant; and
  releasing the first plurality of previously allocated channel state information processing units based at least in part on determining that the second downlink grant has the higher priority than the third downlink grant, wherein the additional channel state information processing unit comprises the released plurality of channel state information processing units.

26. The method of claim 25, wherein a priority associated with the second downlink grant is based at least in part on a type of indication associated with the second downlink grant and a priority associated with the third downlink grant is based at least in part on the type of indication associated with the third downlink grant, and wherein allocating the set of channel state information processing units for transmitting the channel state information report is based at least in part on the priority associated with the second downlink grant and the priority associated with the third downlink grant.

27. The method of claim 26, wherein the type of indication comprises a type 1 indication or a type 2 indication.

28. The method of claim 27, wherein the type 2 indication has a higher priority than the type 1 indication.

29. An apparatus for wireless communication at a user equipment (UE), comprising:
  at least one processor,
  at least one memory coupled with the at least one processor; and
  instructions stored in the at least one memory and executable by the at least one processor to cause the apparatus to:
    receive a downlink grant including an indication to report channel state information;
    identify, based at least in part on the downlink grant, a quantity of channel state information processing units associated with reporting the channel state information;
    determine that an available quantity of channel state information processing units is less than the quantity of channel state information processing units;
    allocate, based at least in part on the determining, a set of channel state information processing units for transmitting a channel state information report, the set of channel state information processing units comprising the available quantity of channel state information processing units and one or more additional channel state information processing units; and
    transmit the channel state information report based at least in part on the set of channel state information processing units.

30. An apparatus for wireless communication at a user equipment (UE), comprising:
  means for receiving a downlink grant including an indication to report channel state information;
  means for identifying, based at least in part on the downlink grant, a quantity of channel state information processing units associated with reporting the channel state information;
  means for determining that an available quantity of channel state information processing units is less than the quantity of channel state information processing units;
  means for allocating, based at least in part on the determining, a set of channel state information processing units for transmitting a channel state information report, the set of channel state information processing units comprising the available quantity of channel state information processing units and one or more additional channel state information processing units; and
  means for transmitting the channel state information report based at least in part on the set of channel state information processing units.

31. The apparatus of claim 29, wherein the instructions are further executable by the at least one processor to cause the apparatus to:
  receive an uplink grant including a second indication to report second channel state information; and
  determine, based at least in part on the uplink grant, a quantity of channel state information processing units associated with reporting the second channel state information, wherein the available quantity of channel state information processing units are identified before allocating the quantity of channel state information processing units for reporting the second channel state information.

32. The apparatus of claim 29, wherein the instructions are further executable by the at least one processor to cause the apparatus to:
  receive an uplink grant including a second indication to report second channel state information; and
  determine, based at least in part on the uplink grant, a quantity of channel state information processing units associated with reporting the second channel state information, wherein the available quantity of channel state information processing units are identified after allocating the quantity of channel state information processing units for reporting the second channel state information.

33. The apparatus of claim 29, wherein the instructions are further executable by the at least one processor to cause the apparatus to:
  receive an uplink grant including a second indication to report second channel state information;
  determine, based at least in part on the uplink grant, a quantity of channel state information processing units associated with reporting the second channel state information; and
  determine that the downlink grant is associated with a higher priority than the uplink grant, wherein the available quantity of channel state information processing units are identified, based at least in part on determining that the downlink grant is associated with the higher priority than the uplink grant, before allocating the quantity of channel state information processing units for reporting the second channel state information.

34. The apparatus of claim 30, further comprising:

means for receiving an uplink grant including a second indication to report second channel state information; and means for determining, based at least in part on the uplink grant, a quantity of channel state information processing units associated with reporting the second channel state information, wherein the available quantity of channel state information processing units are identified before allocating the quantity of channel state information processing units for reporting the second channel state information.

35. The apparatus of claim 30, further comprising:

means for receiving an uplink grant including a second indication to report second channel state information; and means for determining, based at least in part on the uplink grant, a quantity of channel state information processing units associated with reporting the second channel state information, wherein the available quantity of channel state information processing units are identified after allocating the quantity of channel state information processing units for reporting the second channel state information.

* * * * *